US008073615B2

(12) United States Patent
Kudoh et al.

(10) Patent No.: US 8,073,615 B2
(45) Date of Patent: Dec. 6, 2011

(54) DESTINATION-PREDICTION APPARATUS, DESTINATION-PREDICTION METHOD, AND NAVIGATION APPARATUS

(75) Inventors: Takahiro Kudoh, Kanagawa (JP); Eiichi Naito, Kyoto (JP)

(73) Assignee: Panasonic Corporation, Osaka (JP)

( * ) Notice: Subject to any disclaimer, the term of this patent is extended or adjusted under 35 U.S.C. 154(b) by 394 days.

(21) Appl. No.: 12/307,005

(22) PCT Filed: Apr. 28, 2008

(86) PCT No.: PCT/JP2008/001113
§ 371 (c)(1),
(2), (4) Date: Dec. 30, 2008

(87) PCT Pub. No.: WO2008/136193
PCT Pub. Date: Nov. 13, 2008

(65) Prior Publication Data
US 2009/0319176 A1  Dec. 24, 2009

(30) Foreign Application Priority Data
May 2, 2007  (JP) .................... 2007-121862

(51) Int. Cl.
*G01C 21/34* (2006.01)
(52) U.S. Cl. ...................................... 701/207
(58) Field of Classification Search .................. 701/201, 701/207, 209
See application file for complete search history.

(56) References Cited

U.S. PATENT DOCUMENTS

| 6,317,720 | B1 * | 11/2001 | Murakami et al. ........... 705/7.22 |
| 6,453,298 | B2 * | 9/2002 | Murakami et al. ........... 705/7.25 |
| 7,233,861 | B2 * | 6/2007 | Van Buer et al. ........... 701/209 |
| 2004/0083030 | A1 | 4/2004 | Sumida et al. |
| 2004/0128066 | A1 | 7/2004 | Kudo et al. |
| 2005/0125148 | A1 | 6/2005 | Van Buer et al. |
| 2005/0251325 | A1 | 11/2005 | Kudo et al. |

(Continued)

FOREIGN PATENT DOCUMENTS
EP     1 380 813     1/2004
(Continued)

OTHER PUBLICATIONS

European Search Report issued Apr. 20, 2011 in International (PCT) Application No. PCT/JP2007/001113.
(Continued)

*Primary Examiner* — Gerald J. O'Connor
*Assistant Examiner* — Teresa Woods
(74) *Attorney, Agent, or Firm* — Wenderoth, Lind & Ponack, L.L.P.

(57) ABSTRACT

Provided is a destination-prediction apparatus that predicts a destination with increased accuracy than using a conventional technique. The destination-prediction apparatus comprises a candidate-destination selecting unit that selects and orders a plurality of candidate destinations, a drawing processing unit that displays the selected candidate destinations according to the ordering, a rule setting unit that sets a rule that a moving object moves to the candidate destination at a constant frequency during a certain unit period, a unit-period frequency accumulating unit that determines actual frequency at which the moving object has moved to the candidate destination during the unit period, and a actual-frequency judging unit that judges whether or not the actual frequency reaches trip frequency included in the rule. The drawing processing unit displays the candidate destinations, reflecting a result of the judgment that the actual frequency satisfies the rule.

20 Claims, 38 Drawing Sheets

U.S. PATENT DOCUMENTS

| | | |
|---|---|---|
| 2006/0036449 A1 | 2/2006 | Araki et al. |
| 2006/0149459 A1* | 7/2006 | Matsuura et al. ............. 701/201 |
| 2007/0038372 A1 | 2/2007 | Kudo et al. |

FOREIGN PATENT DOCUMENTS

| | | |
|---|---|---|
| JP | 2000-222689 | 8/2000 |
| JP | 2004-145826 | 5/2004 |
| JP | 2005-156350 | 6/2005 |
| JP | 3722229 | 9/2005 |
| JP | 2006-215041 | 8/2006 |
| WO | 2004/049224 | 6/2004 |

OTHER PUBLICATIONS

International Search Report issued Jul. 29, 2008 in the International (PCT) Application of which the present application is the U.S. National Stage.

Extended European Search Report dated Apr. 20, 2011 in corresponding European Patent Application No. 08 751 638.1.

* cited by examiner

FIG. 1

| Rank | Landmark name | Frequency |
|------|---------------|-----------|
| 1 | Learning Center A | 6 |
| 2 | Home | 4 |
| 3 | Parking A | 4 |
| 4 | Supermarket A | 2 |

FIG. 2

| Landmark name | 1st month | | | 2nd month | | | 3rd month | | |
|---|---|---|---|---|---|---|---|---|---|
| | Once | Twice | Three or more | Once | Twice | Three or more | Once | Twice | Three or more |
| Learning Center A | 8 | 0 | 0 | 6 | 0 | 0 | 2 | 0 | 0 |
| Supermarket A | 6 | 0 | 0 | 6 | 0 | 0 | 0 | 0 | 0 |
| Hospital A | 3 | 0 | 0 | 1 | 1 | 1 | 1 | 0 | 0 |

FIG. 3

| Trip ID | Departure time | Departure place | Arrival time | Goal |
|---|---|---|---|---|
| 1 | 12:23 | Home | 13:04 | Learning Center A |
| 2 | 15:03 | Learning Center A | 15:47 | Home |
| 3 | 17:08 | Home | 17:39 | Supermarket A |

FIG. 9

(A) Node data

| Node ID | Attribute | Value |
|---|---|---|
| N1 | Latitude | Lat001 |
| | Longitude | Lon001 |
| | Number of links | 4 |
| | Link IDs | L1, L3, L8, L12 |
| .. | .. | .. |

(B) Supplemental node data

| Node ID | Attribute | Value |
|---|---|---|
| CN1 | Latitude | Lat002 |
| | Longitude | Lon002 |
| | On-the-Link ID | L1 |
| .. | .. | .. |

(C) Link data

| Node ID | Attribute | Value |
|---|---|---|
| L1 | Start point node | N1 |
| | End point node | N5 |
| | Link length | 700 |
| | Width | 15 |
| | Road type | General road |
| | Number of supplemental nodes | 2 |
| | Supplemental node ID [1] | CN1 |
| | Supplemental node ID [2] | CN2 |
| .. | .. | .. |

FIG. 10

(A) Facility data

| Category | Landmark name | ID | Position |
|---|---|---|---|
| Restaurant | Rest A | LM101 | Lat101, Lon101 |
| | Rest B | LM102 | Lat102, Lon102 |
| | ⋮ | ⋮ | ⋮ |
| Supermarket | Shop A | LM151 | Lat151, Lon151 |
| | Shop B | LM152 | Lat152, Lon152 |
| | ⋮ | ⋮ | ⋮ |

(B) User-configured data

| Landmark name | ID | Position |
|---|---|---|
| Home | LM201 | Lat201, Lon201 |
| Office | LM202 | Lat201, Lon202 |
| ⋮ | ⋮ | ⋮ |

FIG. 11

| Date | Departure place | Goal | Route | | | | |
|---|---|---|---|---|---|---|---|
| January 19, 2007 | LM201 | LM202 | L3 | L9 | L12 | ... | ... |
| | 8:43 | 9:25 | 8:45 | 8:50 | 8:56 | ... | ... |
| January 19, 2007 | LM202 | LM201 | L38 | L28 | L27 | ... | ... |
| | 20:02 | 20:35 | 20:03 | 20:05 | 20:10 | ... | ... |
| January 20, 2007 | LM201 | LM101 | L3 | L9 | L14 | ... | ... |
| | 11:30 | 11:54 | 11:32 | 11:36 | 11:38 | ... | ... |
| January 20, 2007 | LM101 | LM151 | L30 | L33 | L42 | ... | ... |
| | 12:48 | 13:05 | 12:49 | 12:52 | 12:55 | ... | ... |
| ... | ... | ... | ... | ... | ... | ... | ... |

FIG. 12

| Priority | Period rule |
|---|---|
| 1 | Trip frequency in a period of "a day" |
| 2 | Trip frequency in a period of "weekdays" or "days-off" |
| 3 | Trip frequency in a period of "a week" |

FIG. 14

(A) Frequency of trip to "Shop A"

|  | Mon. | Tue. | Wed. | Thu. | Fri. | Sat. | Sun. | Weekdays | Days-off | Week |
|---|---|---|---|---|---|---|---|---|---|---|
| 1st Week | 1 | 1 | 1 | 1 | 0 | 0 | 0 | 4 | 0 | 4 |
| 2nd Week | 1 | 1 | 0 | 1 | 1 | 0 | 1 | 4 | 1 | 5 |
| 3rd Week | 1 | 1 | 1 | 0 | 1 | 1 | 0 | 4 | 1 | 5 |
| 4th Week | 1 | 1 | 1 | 0 | 1 | 0 | 0 | 4 | 0 | 4 |

(B) Frequency of trip to "Rest A"

|  | Mon. | Tue. | Wed. | Thu. | Fri. | Sat. | Sun. | Weekdays | Days-off | Week |
|---|---|---|---|---|---|---|---|---|---|---|
| 1st Week | 1 | 0 | 0 | 1 | 0 | 0 | 0 | 2 | 0 | 2 |
| 2nd Week | 0 | 0 | 1 | 1 | 0 | 0 | 0 | 2 | 0 | 2 |
| 3rd Week | 1 | 0 | 0 | 0 | 0 | 0 | 1 | 1 | 1 | 2 |
| 4th Week | 1 | 0 | 0 | 1 | 0 | 0 | 0 | 2 | 0 | 2 |

FIG. 16

| Day class name | Instances |
|---|---|
| Weekdays | Monday, Tuesday, Wednesday, Thursday, Friday |
| Days-off | Saturday, Sunday |

| Time class name | Range |
|---|---|
| Late night | 0 to 6 |
| Morning | 6 to 12 |
| Afternoon | 12 to 18 |
| Evening | 18 to 24 |

FIG. 24

Frequency of trip to "Shop A"

|  | Mon. | Tue. | Wed. | Thu. | Fri. | Sat. | Sun. | Weekdays | Days-off | Week |
|---|---|---|---|---|---|---|---|---|---|---|
| 1st Week | 2 | 0 | 1 | 1 | 0 | 0 | 0 | 4 | 0 | 4 |
| 2nd Week | 1 | 1 | 0 | 0 | 1 | 0 | 1 | 3 | 1 | 4 |
| 3rd Week | 0 | 2 | 1 | 1 | 1 | 0 | 0 | 5 | 0 | 5 |
| 4th Week | 1 | 1 | 1 | 0 | 1 | 1 | 0 | 4 | 1 | 5 |

FIG. 27

(Unit: time)

| Category name | Day | Week | Month |
|---|---|---|---|
| Gas stations | 1 | 1 | – |
| Fast food places | 1 | 1 | – |
| Learning centers | 1 | 2 | >3 |
| Electronics stores | – | 1 | – |
| . . | . . | . . | . . |

FIG. 30

(Unit: person)

| Category name | Day | | | Week | | | Month | | |
|---|---|---|---|---|---|---|---|---|---|
| | Once | Twice | Three or more | Once | Twice | Three or more | Once | Twice | Three or more |
| Gas stations | 29 | 0 | 0 | 29 | 0 | 0 | 8 | 0 | 21 |
| Fast food places | 22 | 0 | 0 | 22 | 0 | 0 | 11 | 11 | 0 |
| Learning centers | 21 | 4 | 0 | 0 | 25 | 0 | 0 | 0 | 25 |
| ‥ | ‥ | ‥ | ‥ | ‥ | ‥ | ‥ | ‥ | ‥ | ‥ |

FIG. 38
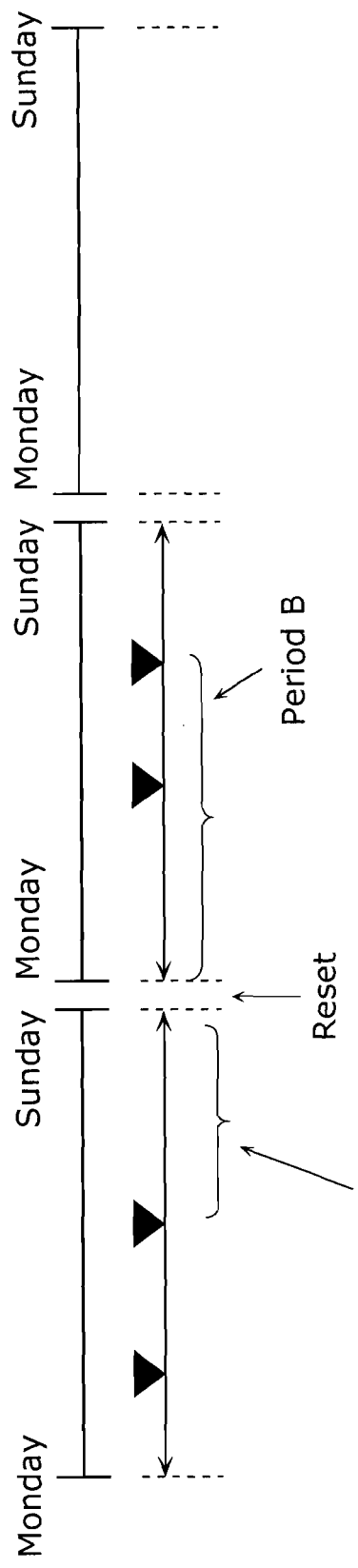
(a) Unit of "a week" according to calendar
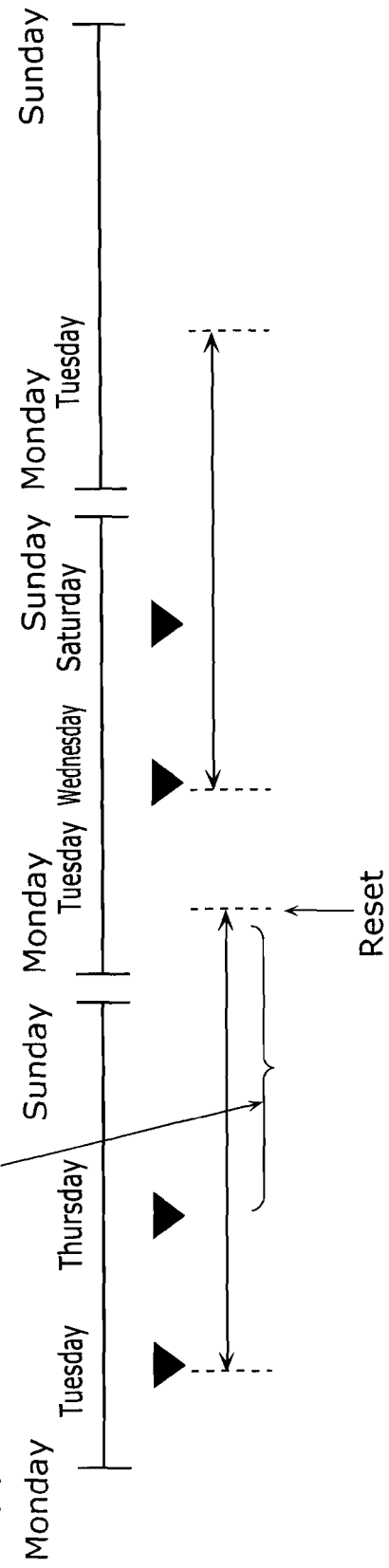
(b) Unit of "a week" starting upon occurrence of trip

DESTINATION-PREDICTION APPARATUS, DESTINATION-PREDICTION METHOD, AND NAVIGATION APPARATUS

TECHNICAL FIELD

The present invention relates to a destination-prediction apparatus, a navigation apparatus such as a car navigation system or a mobile phone to which the destination-prediction apparatus is applied, and a destination-prediction method. The destination-prediction apparatus predicts a route that a user will take or a destination such as a goal on the basis of trip history data in a mobile terminal installed in a vehicle or carried by the user.

BACKGROUND ART

Conventionally, there is a disclosed example of a technique applied to a navigation apparatus to be installed in a vehicle. The navigation apparatus predicts, on the basis of a past trip history of the vehicle, a goal for which the vehicle is heading. The trip history includes start and end points of trips and days and times of the trips (See Patent Reference 1, for example). According to Patent Reference 1, the navigation apparatus searches a past trip history for a record of moving at "20:30, Thursday" when, for example, a driver is traveling in a vehicle at 20:30 on a Thursday. In the case where a search result shows that the vehicle moved to a landmark A three times and a landmark B once at corresponding times and on corresponding days in the past, the landmark A is predicted to be a goal with a high probability of 75%. In the case where there is no record of moving at "20:30, Thursday" in the past, the condition for searching for a history record is eased to, for example, "20:30, weekday" to extract an appropriate record, so that a landmark to be a goal is predicted similarly on the basis of trip frequency. In this example, a "day" of Thursday, is generalized to a larger set (hereinafter referred to as class) of "weekdays". Similarly, the "time" of 20:30 may be categorized into a defined class such as "evening (18:00 to 24:00)" for the purpose of calculating a prediction probability on the basis of frequency using more history records. Using such classes for prediction is effective not only for the case where there is no record to satisfy a condition but also from viewpoint of increasing reliability of a prediction probability, because referring to more data items in a calculation of probability generally increases reliability.

Patent Reference 1: Japanese Unexamined Patent Application Publication No. 2005-156350

SUMMARY OF THE INVENTION

Problems that Invention is to Solve

There is a problem, however, with a method of the conventional technique of predicting a destination using only frequencies of trips that belong to the same class as a trip for which a destination is to be predicted. For example, when a trip history of "Monday morning" has 20 records of a trip to the landmark A and 10 records of a trip to the landmark B, the landmark A is predicted to be a goal with the highest probability of 67%. On the other hand, in the case where a user has a characteristic of making a trip to the landmark A only once a day, a navigation apparatus predicts that the user will make a trip to the landmark A with the highest probability at 8:00 on a Monday when the user starts an engine. However, even after the user has moved to the landmark A and starts the engine again at 11:00 in this case, the navigation apparatus will predict the landmark A again regardless of the user's characteristic of making a trip to the landmark A only once a day, because the user moves to the landmark A most frequently in view of a class of "Monday morning". The problem is that highly accurate prediction cannot be achieved using a method as described above where prediction is based on only high and low frequencies found in a searched history that has a similar trip condition to a trip for which a destination is predicted.

The present invention, conceived to address the problem with the conventional technique described above, has an object of providing a destination-prediction apparatus, a navigation apparatus, and the like that predict a destination with higher accuracy than the conventional technique.

Means to Solve the Problems

In order to develop a technique to predict a destination (a goal or an intersection to be moved to) using a trip history, the inventors conducted an experiment on approximately 30 subjects in order to collect their trip histories by vehicles for three months for the purpose of verification of prediction accuracy. Hereinafter, the experiment is described with reference to FIGS. 1 to 6.

In the experiment, frequencies of trips to goals to which one of the subjects, Subject I made trips from "Home" during a period classed as "12:00 to 18:00, days-off (Saturday, Sunday, etc.)" has been accumulated for three months. FIG. 1 lists some of the goals in standings in descending order of frequency. As shown in FIG. 1, a trip to the "Learning center A" occurred most frequently, six times. This is followed by a round trip from "Home" to "Home" without cutting an engine and a trip from "Home" to the "Parking A", both of which occurred at the same frequency of four times. Shown at the bottom of the table is a trip, which occurred twice, to the "Supermarket A".

FIG. 2 shows trip frequencies per unit of "a day" with respect to Subject I again. These trip frequencies are sorted by landmarks to be goals and by months. Specifically, in the first month, Subject I made a trip to the "Learning center A" once in "a day" on eight days, but not on a single day twice or three times or more in "a day". Similarly, in the second month, Subject I made the trip there once in a day on some days, but not twice or more on any days. This shows that Subject I made the trip to "Learning center A" once in "a day" at the maximum. In contrast, Subject I made a trip to the "Hospital A" once in "a day" on one day, and twice on another day. This shows that there is no fixed frequency of the trip to the "Hospital A" in "a day".

FIG. 3 lists actual trips of the Subject I again in the order of occurrence. These trips occurred between 12:00 and 18:00 on Saturday, Nov. 5, 2005. A trip with an ID 1 indicates that Subject I left home at 12:23 for the learning center A. By using the prediction method according to Patent Reference 1 for predicting a goal at the departure from home, the goal is predicted to be the learning center A with the highest probability or the home or the parking A with the second highest probability on the basis of the frequency information in FIG. 1. An application that uses such a prediction result and displays names of goals (with the three highest probabilities) along with estimated times of arrivals at the goals on a car navigation apparatus will present a screen shown in FIG. 4 to Subject I. FIG. 4 shows a screen to be displayed to the Subject I on a display of a car navigation by an application that uses such a prediction result and lists names of goals (with the three highest probabilities) along with estimated times of arrivals at the goals.

Subject I actually had a trip of the ID 1 to a goal of the learning center A. This prediction thus proves to be successful.

Then, the Subject I had a trip of an ID 2 departing the learning center A at 15:03 back for home, and had another trip of an ID 3 departing home at 17:08. By using the conventional prediction method, a goal of this trip is predicted to be the learning center A with the highest probability again as in the case with the trip of ID 1. In this case, the Subject I has a screen as shown in FIG. 5.

However, this prediction proves to be unsuccessful because the Subject I actually went to the supermarket A in the trip. One of the reasons for this is that such prediction is not based on consideration of a characteristic of the Subject I regarding the trip frequency that can be found for "a day" with respect to each of the landmarks. To put it another way, considering the characteristic shown in FIG. 2, the prediction would prove to be successful by excluding the learning center A from prediction for the trip of ID 3 and promoting the supermarket A, the fourth most frequent goal in FIG. 1, instead so that a screen in FIG. 6 could be presented to the Subject I.

The present invention increases prediction accuracy by utilizing, as rules, characteristics of frequencies of trips to landmarks, intersections, or streets that are goals to which a user has moved during a predetermined period.

In order to address the problem with the conventional technique, the destination-prediction apparatus according to the present invention predicts a destination of a moving object, and includes: an obtaining unit configured to obtain trip history data indicating a trip history of the moving object; a position detecting unit configured to detect a present position of the moving object; a candidate-destination selecting unit configured to search the trip history data for trip history records containing the present position of the moving object and select a plurality of candidate destinations and set an order thereof on a basis of frequencies of the trip history records retrieved in the search, the trip history data being obtained by the obtaining unit, and the present position being detected by the position detecting unit; a display unit configured to display, according to the order, the plurality of candidate destinations selected by the candidate-destination selecting unit; a rule setting unit configured to judge, with regard to at least each of the plurality of candidate destinations, whether or not there is a rule that the moving object moves to the candidate destination at a constant trip frequency during a certain unit period, and set a rule that includes the unit period and the trip frequency when there is the rule; a unit-period frequency accumulating unit configured to specify, with reference to the trip history data, an actual frequency with regard to one of the plurality of the candidate destinations with regard to which the rule setting unit judges that there is the rule, the actual frequency being a frequency at which the moving object has moved to the candidate destination during the unit period; and an actual-frequency judging unit configured to make a judgment, with regard to each of the plurality of candidate destinations, on whether or not the actual frequency specified by the unit-period frequency accumulating unit satisfies the rule by judging whether or not the actual frequency has reached the trip frequency included in the rule, the display unit being configured to display the plurality of candidate destinations so that a result of the judgment is reflected thereon when the actual-frequency judging unit judges that the actual frequency satisfies the rule. The display unit is a functional device that is a combination of the drawing processing unit 117 and the display unit 106 in the embodiments described below.

This configuration will achieve prediction of a destination with a high accuracy using a user's regularity of frequency of trips to destinations such as a landmark, an intersection, and a road in a predetermined unit period.

Here, the destination-prediction apparatus preferably further includes a display unit configured to display the plurality of candidate destinations according to the order changed by the actual-frequency judging unit This configuration will allow a user to make use of a finite display area efficiently and prevent the user from browsing or listening to unnecessary information by avoiding presenting such unnecessary information to the user visually or audibly.

The present invention may be implemented not only as the destination-prediction apparatus, but also as a navigation apparatus including the destination-prediction apparatus, a destination-prediction method, a computer-executable program, or a computer-readable storage medium, such as a CD-ROM, that stores such a program.

Effects of the Invention

In order to achieve high-accuracy prediction, the destination-prediction apparatus according to the present invention predicts a destination on the basis of trip history data, taking two trip probabilities into consideration. One trip probability is based on past trip frequency under a condition similar to that of movement for which a destination is being predicted, and the other is based on a rule about frequency of a trip to a destination (such as a landmark, an intersection, or a road) in a predetermined unit period.

The use will be thus shown only destinations with high probability, instead having information unnecessary to the user. The present invention has a great deal of practical value for securing usability for users and safety for driving, especially when applied as a car navigation apparatus.

BRIEF DESCRIPTION OF DRAWINGS

FIG. 1 shows a goal to be a destination in a class and actual data regarding frequency to there.

FIG. 2 shows actual data regarding characteristics of frequencies of trips to each landmark in a predetermined period.

FIG. 3 shows actual data that indicates trips on a day chronologically.

FIG. 9 shows map data stored in a storage unit. FIG. 9(A) shows node data. FIG. 9(B) shows supplemental node data. FIG. 9(C) shows link data.

FIG. 10 shows landmark data stored in the storage unit. FIG. 10(A) shows facility data. FIG. 10(B) shows user-configured data.

FIG. 11 shows trip history data stored in the storage unit.

FIG. 12 shows period rule data stored in the storage unit.

FIGS. 14(A) and (B) show examples of actual frequencies of trips to destinations in a predetermined period.

FIG. 16 shows day classes and time classes to be used in the process of selecting a candidate destination.

FIG. 24 shows an example of actual frequency of a trip to a destination in a predetermined period.

FIG. 27 shows general-frequency-rule data stored in the storage unit.

FIG. 30 shows an example of numbers of people who have actually made a trip to each destination in a predetermined period by frequency.

FIGS. 38(a) and (b) show processes that depend on unit periods of different definitions.

NUMERICAL REFERENCES

Figure 4:
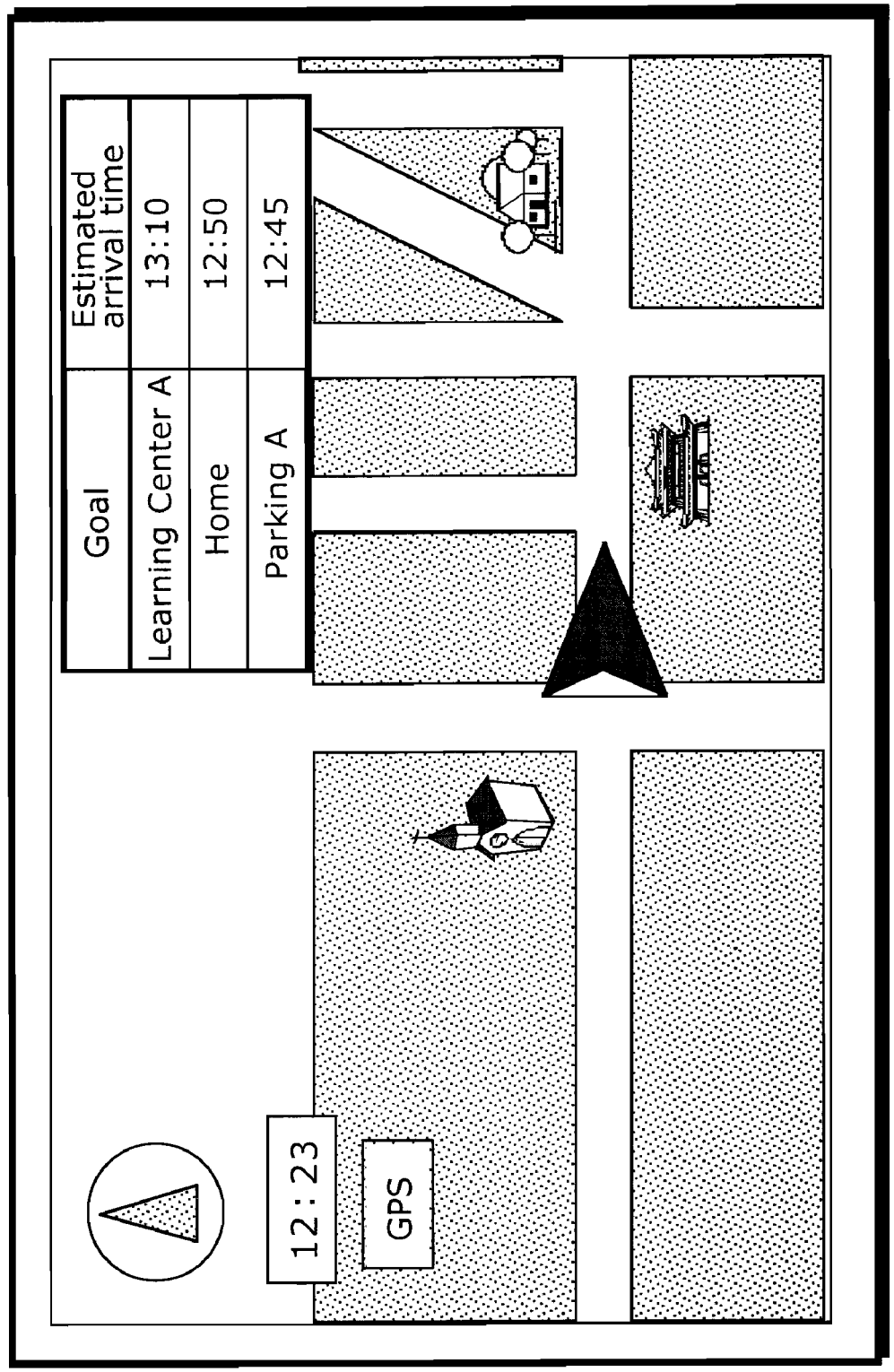
FIG. 4 shows an example of a screen in an application when using a prediction method according to a conventional technique.
Figure 5:
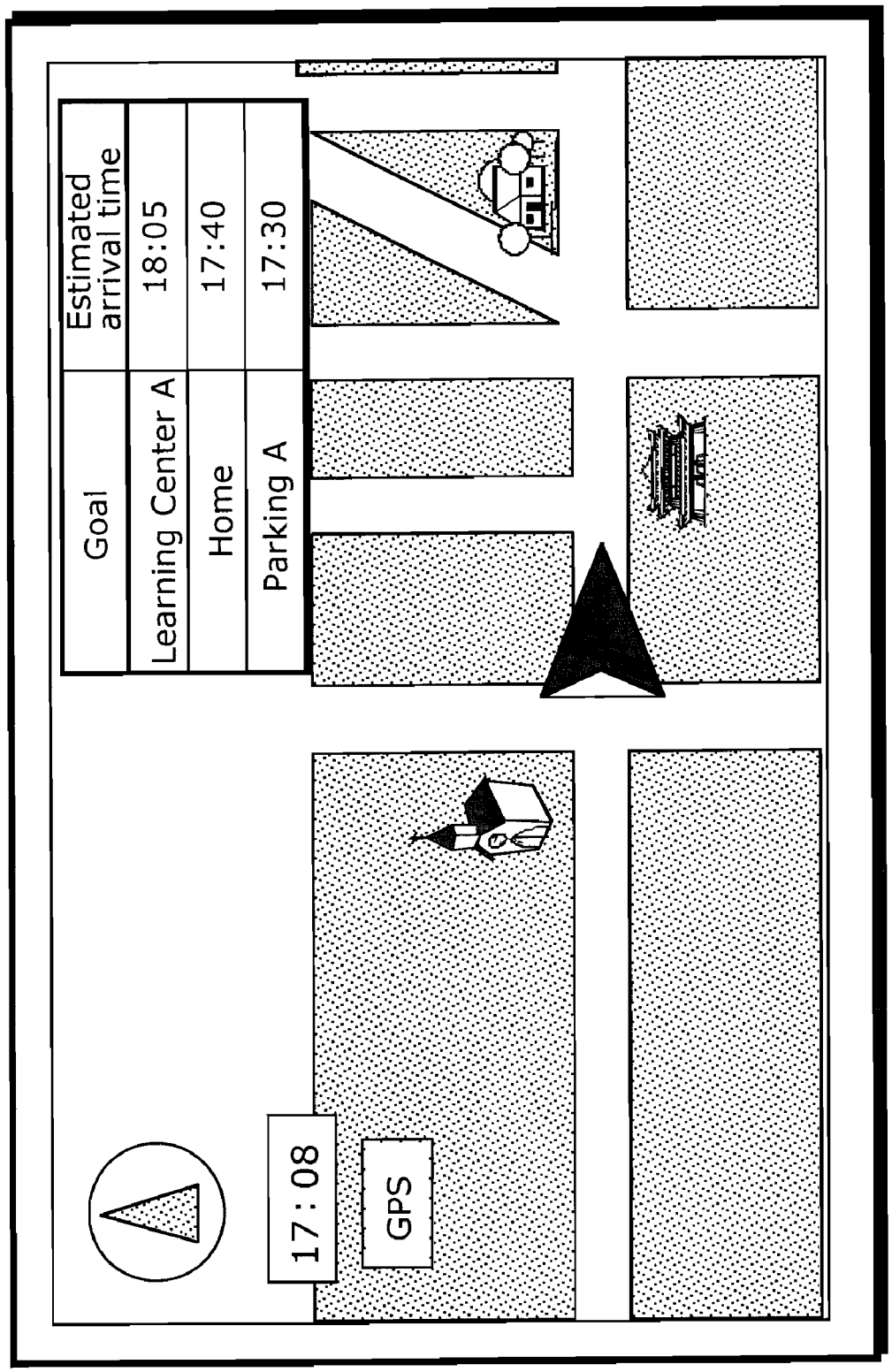
FIG. 5 shows an example of a screen in an application that fails in prediction when using a prediction method according to a conventional technique.
Figure 6:
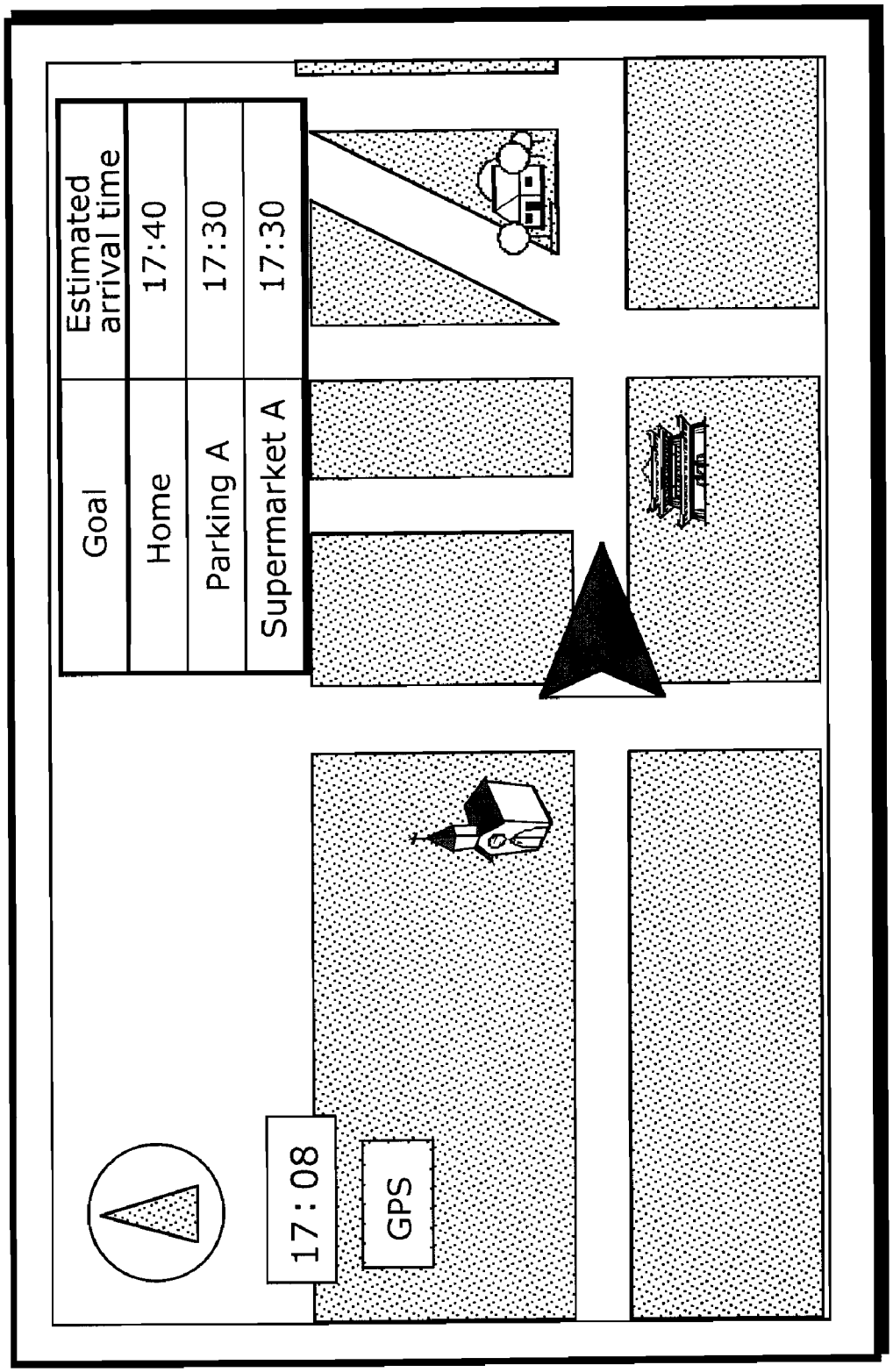
FIG. 6 shows an example of a screen in an application that succeeds in prediction when using a prediction method that is based on a rule about trip frequency in a predetermined period.

101, 101a, 101b Navigation apparatus
102 Day-and-time detecting unit
103 Position detecting unit
104 Storage unit
105 Control unit
106 Display unit
107 Landmark data
108 Map data
109 Trip history data
110 Data handling unit
111 Matching unit
112 Candidate-destination selecting unit
113, 113a Period setting unit
114 Rule extracting unit
115 Unit-period frequency accumulating unit
116 Actual-frequency judging unit
117 Drawing processing unit
120 Period rule data
130, 130a, 130b Rule setting unit
131 Maximum-frequency determining unit
1801 General-frequency-rule data

DETAILED DESCRIPTION OF THE INVENTION

Hereinafter, embodiments of the present invention is described with reference to figures.

First Embodiment

First described is the first embodiment of the present invention.

Figure 7:
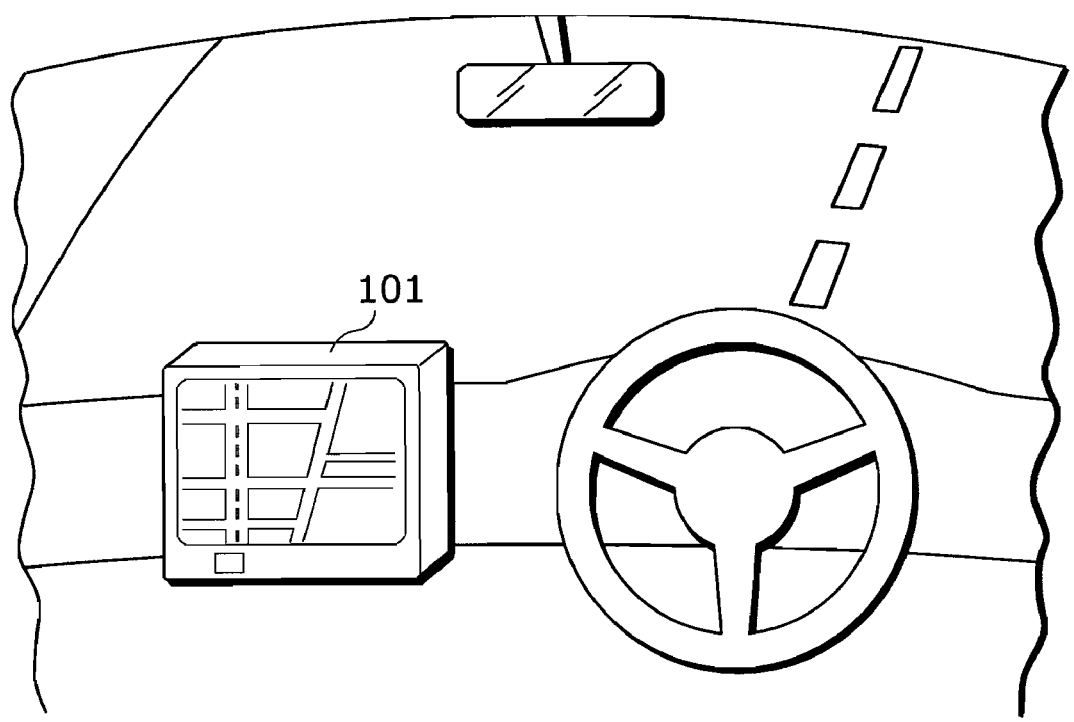
FIG. 7 shows an external view of a navigation apparatus according to the first embodiment of the present invention.

FIG. 7 is an outline view of a navigation apparatus 101 that is an embodiment of a destination-prediction apparatus according to the present invention. The navigation apparatus 101, which is installed in a car, is a navigation apparatus functions as a destination-prediction apparatus according to the present invention and displays a predicted destination.

Figure 8:
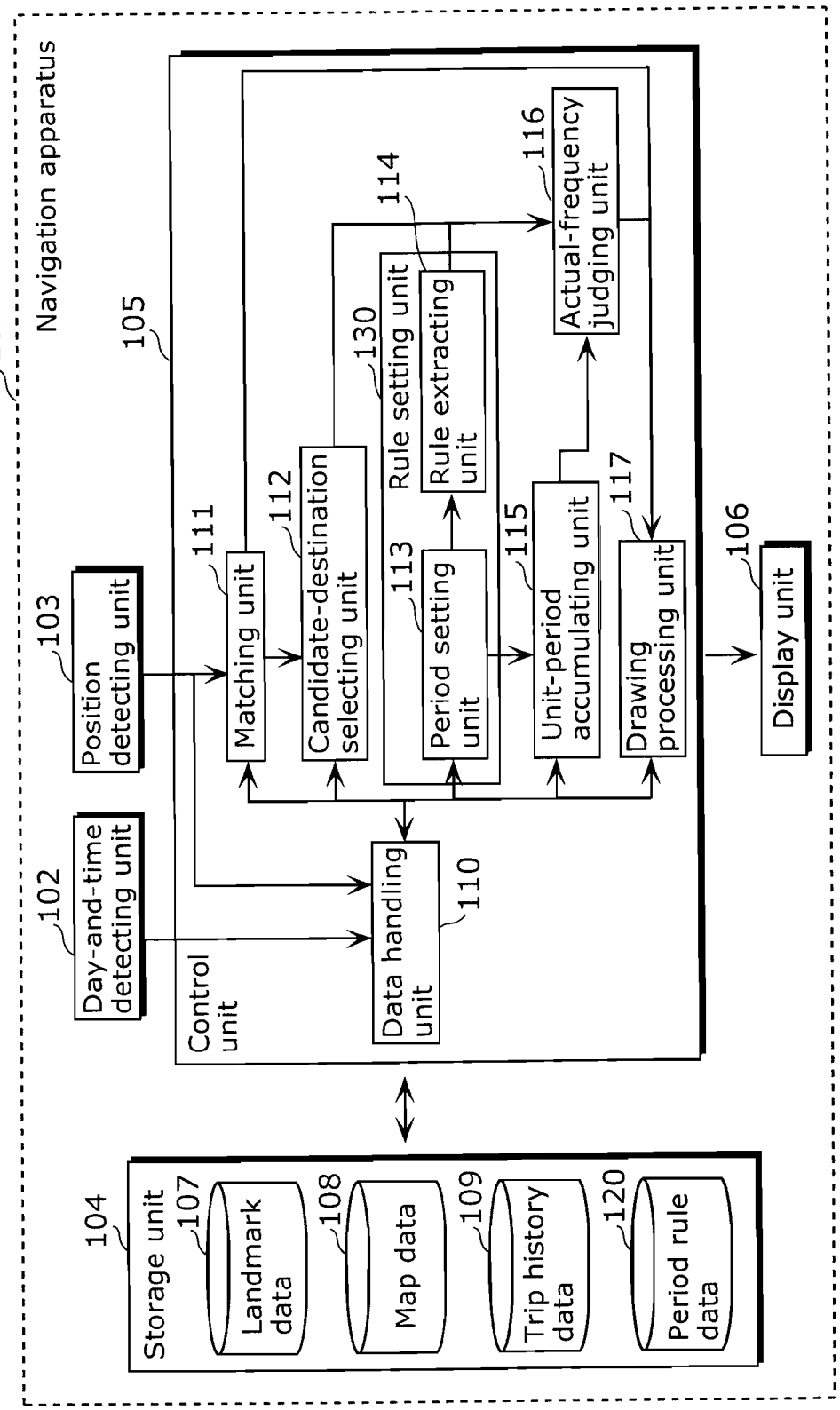
FIG. 8 shows a configuration of a navigation apparatus according to the first embodiment of the present invention.

FIG. 8 shows a configuration of the navigation apparatus 101 according to the first embodiment of the present invention. The navigation apparatus 101 is a car navigation apparatus capable of predicting a destination with a high accuracy using regularity of a user (or a moving object) that moves to a destination at a constant trip frequency during a certain unit period. This navigation apparatus includes a day-and-time detecting unit 102, a position detecting unit 103, a storage unit 104, a control unit 105, and a display unit 106.

The day-and-time detecting unit 102, which may be a calendar-equipped clock, detects a present day and time.

The position detecting unit 103 is installed in a vehicle provided with the navigation apparatus 101 and detects a present position, a speed, orientation, or a present time. The position detecting unit 103 is, for example, a global navigation satellite system (GNSS) receiver, a vehicle speed sensor, a gyroscope (or an angular velocity sensor), or an acceleration sensor. The GNSS receiver measures and determines an absolute position of the receiver by demodulating radio waves received from a plurality of satellites. The GNSS receiver is, for example, a GPS receiver. The GNSS receiver and these sensors are used alone or in combination for determining the present position, the speed, and the orientation.

The display unit 106 displays an image according to display image data generated by the control unit 105. The display unit 106 is, for example, a liquid-crystal display or an organic EL display.

The storage unit 104 stores map information such as data of roads, intersections, and landmarks, and a trip history of a vehicle that is provided with the navigation apparatus 101. The storage unit 104 is, for example, a hard disk drive (HDD), an optical storage medium such as digital versatile disk (DVD), or another storage medium such as a flash memory. These storage media may be configured to be detachable. The storage unit 104 may also be of a configuration where information to be stored is downloaded as necessary from a server system (not shown) through a communication unit not shown here (a mobile phone, a PHS, for example).

Data to be stored in the storage unit 104 includes map data 108, landmark data 107, trip history data 109, and period rule data 120.

FIG. 9 shows excerpt data of information related to the first embodiment from map information stored in the map data 108. The map data 108 includes (A) node data, (B) supplemental node data, and (C) link data. The (A) node data indicates a point such as an intersection or a confluence where roads branch off in some directions. Each node data item is composed pf position information such as a latitude and a longitude, number of links linked to the node, and an ID of the link. The links are described later. The (B) supplemental node data indicates a bending point on a link, which is described later, when the link is not straight. Each supplemental node data item is composed of position information such as a latitude and a longitude and an ID of a link on which the supplemental node data is. The (C) link data indicates a road that connects one node to another. Each link data item is composed of a start point node and an end point node which are ends of a link, length of the link (in meters, kilometers, or the like), width of the link (in meters or the like), a road type such as a general road or an expressway, the number of the aforementioned supplemental nodes and IDs thereof.

FIG. 10 shows information stored in the landmark data 107. The (A) facility data contains landmarks registered by a manufacturer of the navigation apparatus 101, an information service provider, or like that. Each Landmark item is composed of a landmark name, category of the landmark, a uniquely assigned ID, and position information such as a latitude and a longitude. On the other hand, each landmark item registered in (B) user-configured data by a user is composed of a landmark name, a uniquely assigned ID, and position information such as a latitude and a longitude. Unlike the landmark name in the (A) facility data, the user may register names meaningful to the user as the landmark names in the (B) user-configured data, such as "Home" and "Office".

FIG. 11 shows an example of data stored in the trip history data 109. The trip history data 109 stores a history of present positions that are detected by the position detecting unit and associated with present days and times detected by the day-and-time detecting unit 102. While the user is making a trip in the vehicle, the day-and-time detecting unit 102 detects days and times, and the position detecting unit 103 detects positions of the vehicle. The trip history data 109 stores information about the days and times of the trip and the positions of the vehicle for a segment from start of the trip to end of it, that is, a start point, a goal, and a route, chronologically. The position information detected by the position detecting unit 103 is translated to an ID such as of a landmark or a link where the vehicle is situated by an after-mentioned matching unit 111 of the control unit 105. The trip history data 109 stores the ID information. For example, the trip history at the top of FIG. 11 indicates that the vehicle departed a landmark of an ID LM201 at 8:43 on Jan. 19, 2007, moved along a road of a link ID L3 at 8:45, a road of a link ID 9 at 8:50, a road of a link ID 12 at 8:56, and links not shown, to reach a goal, a landmark of a landmark ID 202 at 9:25.

The start of the trip of the vehicle can be detected with a start of an engine, and the end of the trip with a stop of the engine. Although the link IDs of the roads along which the vehicle moved are stored as information for the route in this example, node IDs that indicate intersections by which the vehicle passes by may be stored instead.

FIG. 12 shows an example of data stored in the period rule data 120. The period rule data 120 stores rules about periods. The rules are referred to by the rule setting unit 130 when it extracts a rule about frequency of a trip to each of the landmarks as described later. As shown in FIG. 12, priority has been established for application of the rules. The highest priority is given to attempting to extract a rule of trip frequency for a period of "a day". In the case where no rule for the period of "a day" is extracted as a result of following a process by the rule setting unit 130 described later, another attempt will be made to extract a rule of trip frequency for a period with the second highest priority, "weekdays" or "days-off". Similarly, there are period rules that are subsequently applied according to the priority. The highest priority for the rules in the period rule data 120 is given to the rule for the shortest period, "a day", and lower application priorities to the rules for the longer period such as "a week". A reason for this will be given later in detail.

The control unit 105 is implemented with a CPU or an MPU which controls entire operation of the navigation apparatus 101, and a read only memory (ROM), a random access memory (RAM) or the like. From a viewpoint of functions, the control unit 105 includes a data handling unit 110, a matching unit 111, a candidate-destination selecting unit 112, a rule setting unit 130, a unit-period frequency accumulating unit 115, an actual-frequency judging unit 116, and a drawing processing unit 117. Hereinafter, each of these components is described in detail.

The data handling unit 110 functions as a processing unit that handles data transfer between the other components of the control unit 105 and the storage unit 104, such as accumulation of trip history data in the storage unit 104 or read and acquisition of data 107 to 120 from the storage unit 104. Processes by the data handling unit 110 includes transferring data from the landmark data 107 or the map data 108 to the matching unit 111 when the matching unit 111 executes map-matching process, accumulating IDs of map-matched position information with day-and-time information detected by the day-and-time detecting unit 102 in the trip history data 109, searching the trip history data 109 or the period rule data 120 when processes necessary for destination prediction is executed, and transferring map data from the storage unit 104 to the drawing processing unit 117 which displays the map data on the display unit 106. These processes will be described later in detail.

The matching unit 111, referring to the landmark data 107 or the map data 108 obtained through the data handling unit 110, executes map-matching process to translate the position information detected by the position detecting unit 103 to IDs. The map-matching process is a function already in practical use for a conventional navigation apparatus and, accordingly, will not be described in the present description in detail.

The candidate-destination selecting unit 112 operates in conjunction with the matching unit 111 in order to search the trip history data 109 stored in the storage unit 104 via the data handling unit 110 for a trip history record that contains the present position of the moving object detected by the position detecting unit 103. The candidate-destination selecting unit 112 then selects a plurality of candidate destinations and set an order of the plurality of candidate destinations on the basis of frequency of the retrieved trip history record. Specifically, in order to select the candidates, the candidate-destination selecting unit 112 searches the trip history data 109 for destinations where the user moved to on the same day and time and at the same position in the past, referring to day-and-time information detected by the day-and-time detecting unit and position information map-matched by the matching unit 111.

The rule deciding unit 130 is a processing unit that has a period setting unit 113 and a rule extracting unit 114 and judges, with respect to at least each of the plurality of candidate destinations selected by the candidate-destination selecting unit 112, whether a rule that the moving object moves to the candidate destination at a constant trip frequency in a certain unit period is recognized. The rule deciding unit 130 then sets a rule using the unit period and the trip frequency when the rule is recognized.

The period setting unit 113 is a processing unit that sets a unit period for specifying a rule. The period setting unit 113, referring to the period rules stored in the period rule data 120, sets a period as a unit for a rule when a rule about trip frequency for a destination such as a landmark, a road, or an intersection is extracted from the trip history data 109. The unit may be, for example, "a day" for "Move to the landmark A once in a day" or "a week" for "Move along Route 1 four times in a week".

The rule extracting unit 114 is a processing unit that sets (or extracts) a specified frequency as a rule, in other words, makes a rule for the unit period set by the period setting unit 113 using the trip frequency for each destination. The rule extracting unit 114 specifies, by analyzing the trip history 109, the frequency of trip of the moving object to each of the plurality of the candidate destinations selected by the candidate-destination selecting unit 112 during the unit period set by the period setting unit 113.

Figure 13:
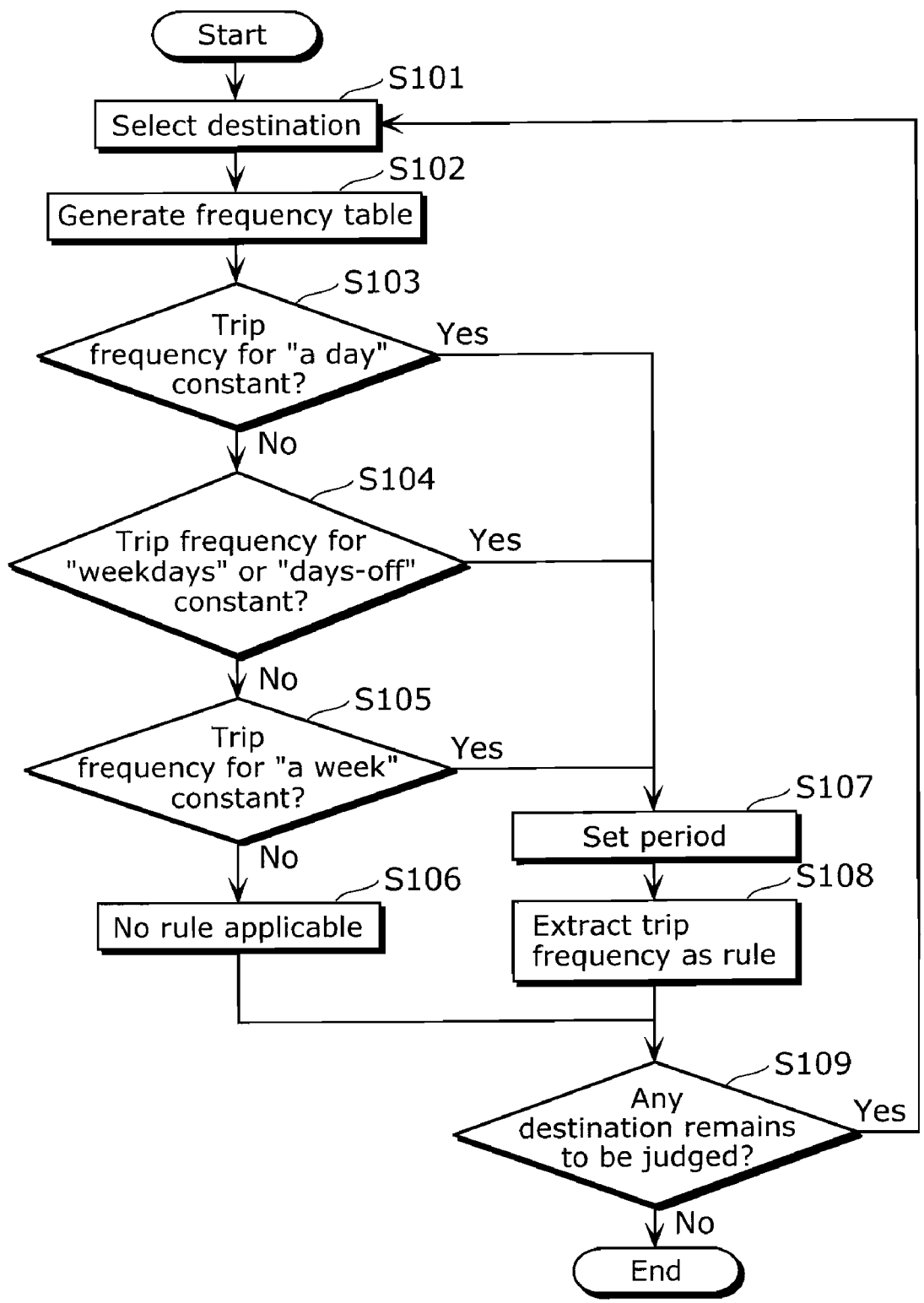
FIG. 13 is a flowchart that shows flow of process by a period setting unit and a rule extracting unit according to the first embodiment of the present invention.

Flow of process by the period setting unit 113 and the rule extracting unit 114 is described in detail with reference to a flowchart shown in FIG. 13. First, the period setting unit 113 refers to the trip history data 109 and extract one of the IDs of the destinations (S101). Although goals or routes in the trip history data 109 are counted as the destinations, here described is a case where the IDs of the goals are extracted. When the extracted destination ID is "Shop A", the period setting unit 113 then generates a table by calculating daily frequency of a trip of the user to the "Shop A" from a trip history data of a predetermined range (four weeks, for example) of the trip history data 109 (S102). FIG. 14(A) shows an example of the generated table. As shown in FIG. 14(A), the table stores trip frequencies for each of 28 days, or four weeks from Monday to Sunday, trip frequencies for each of the weeks in view of a class of weekdays from Monday to Friday, trip frequencies for each of the weeks in view of a class of days-off of Saturday and Sunday, and trip frequencies for each of the weeks from Monday to Sunday, that is, sums of trip frequencies for weekdays and days-off.

Subsequently, the period setting unit 113 refers to the table to judges whether or not trip frequency for the unit of "a day" that has the highest priority stored in the period rule data 120 is constant (S103). FIG. 14(A) shows that the user moves to the "Shop A" once on some days but not on other days. This proves that the trip frequency is not constant. When judging that the trip frequency in not constant (No in S103), the period setting unit 113 then judges whether or not trip frequency for the unit of "weekdays" or "days-off" that has the second highest priority stored in the period rule data 120 is constant (S104). For "days-off", the user makes a trip to there once in some weeks but not in other weeks, without a constant frequency. For "weekdays", however, the user makes a trip to there four times in all the weeks with a constant frequency. When judging that the trip frequency is constant (Yes in S104), the period setting unit 113 sets "weekdays" as a period to be used for extracting a rule for frequency of the trip to the "Shop A" (S107). Following the setting of the period by the period setting unit 113, the rule extracting unit 114 extracts a rule of "four times for weekdays" for the frequency of the trip to the "Shop A" (S108).

The period setting unit 113 subsequently judges whether or not the there is still a destination for which a period has not been set in the trip history data 109 (S109). When there is (Yes in S109), the period setting unit 113 selects a new destination (S101). When the newly selected destination is, for example, "Rest A", the period setting unit 113 generates a frequency table for the "Rest A" (S102). FIG. 14(B) shows a frequency table for the "Rest A".

The period setting unit 113 newly judges, with respect to the new destination, whether or not trip frequency for the unit of "a day" that has the highest priority stored in the period rule data 120 is constant (S103). FIG. 14(B) shows that the user moves to the "Rest A" once on some days but not on other days. This proves that the trip frequency is not constant. When judging that that the trip frequency in not constant (No in S103), the period setting unit 113 judges whether or not trip frequency for the unit of "weekdays" or "days-off" that has the second highest priority stored in the period rule data 120 is constant (S104). The frequency is not constant either for "weekdays" or "days-off". When judging the trip frequency is not constant (No in S104), the period setting unit 113 then judges whether or not trip frequency for the unit of "a week" that has the third highest priority stored in the period rule data 120 is constant. For the unit of "a week", the user moves to the "Rest A" twice every week. This proves that the frequency is constant. When judging that the trip frequency is constant (Yes in S104), the period setting unit 113 sets "a week" as a period to be used for extracting a rule for the frequency of the trip to the "Rest A" (S107). Following the setting of the period by the period setting unit 113, the rule extracting unit 111 extracts a rule of "twice in a week" for the frequency of the trip to the "Rest A" (S108).

The period setting unit 113 subsequently judges whether or not there is still a destination for which a period has not been set in the trip history data 109 (S109). Such a process is executed again when there is (Yes in S109). Otherwise (No in S109), the process is ended.

In the case where there is no constant trip frequency for "a day", "weekday or days-off", or "a week" (No in S105), the rule extracting unit 114 judges that there is no rule about frequency for the destination, and the period setting unit 113 judges whether or not there is still a destination for which such a judgment has not been made yet (S109).

This is how the period setting unit 113 refers to the trip history data 109 stored in the storage unit 104 via the data handling unit 110 and thereby specifies a period for which there is constant frequency of a trip of the moving object to a candidate destination and sets the specified period as a unit period.

Although trip history data of four weeks is used as a reference by the period setting unit 113 for setting a unit period such as "a day", "weekdays or days-off", or "a week" in the first embodiment, a history of any days can be used as a reference history. Further, a period other than the above, such as "ten days", "a month", "three months", "a half year", or "a year", may be considered to be a period about which the rules stored in the period rule data 120 are. It is noted that a reference history of a period longer than a month is necessary for extracting a rule for a unit period of "a month" or longer.

In addition, although the first embodiment describes an example where a trip frequency rule is extracted for a specific landmark such as the "Shop A" or the "Rest A", a rule can be also extracted not for such a specific facility but for a category. Categories such as "restaurants" or "supermarkets" to which facilities belong can be specified by referring to the landmark data 107 in FIG. 10. Trip frequency for each category can be thus calculated by aggregating frequencies of trips to respective facilities. This enables extracting a rule such as "once for days-off" for the category of "restaurants".

Such extracting of a rule for a category is effective especially in the following case. Considering a trip for shopping by a housewife, for example, the housewife may usually have a plurality of shops to go for shopping, such as "Shop A", "Shop B", and "Shop C". On a basis of a period of a week, frequency of trips to these shops may fluctuate as follows: twice for the "Shop A", twice for the "Shop B", and once for the "Shop C" in a week; once for the "Shop A", twice for the "Shop B", and twice for the "Shop C" in another week; and once for the "Shop A", once for the "Shop B", and three times for the "Shop C" in another week. In this case, a rule of trip frequency may not be always extracted for a specific landmark. However, a rule of trip frequency of five times in a week can be extracted not for any of the landmarks but for the category of "supermarkets" to which these landmarks belong. Such process can be executed in order to judge whether or not a trip rule can be extracted from a viewpoint of a category to which a specific landmark belongs in the case where no trip rule for the landmark can be extracted.

Although the example describes that the period setting unit 113 judges the trip frequency for weekdays to be constant when, for example, four weekly frequencies in a history of four weeks are identical, definition of "constant" may be expanded as follows. For example, when referring to a history of ten weeks shows that a trip to a destination was made four times for a span of weekdays in eight weeks, three times in one week, and five times in one week, this is judged to be "not constant" according to the original definition. With a predetermined threshold (80%, for example), the frequency may be judged to be "constant" when weeks more than the threshold have identical frequencies. In this example, such trip was made four times in eight weeks out of ten, that is, more than the threshold of 80%; therefore, the frequency is judged to be constant, and a rule of "four times for weekdays" may be extracted for the destination. A rule can be extracted thereby when such a tendency (regularity) is recognizable even when not all trip frequencies are identical.

In the case where a rule of "five times for weekdays" is extracted while the user moves to there once on every day from Monday to Friday on a basis of a unit of "a day", the period "weekdays" and "a day" can be used in combination to set a rule such as "once a day for weekdays". Using such a combined rule will enable configuring a rule about trip frequency for increased accuracy.

The unit-period frequency accumulating unit 115 is a processing unit that specifies an actual frequency at which the moving object moved to the candidate destination during a unit period with reference to the trip history data 109 with regard to at least a candidate destination for which the rule setting unit 130 judges that there is a rule. The trip history data 109 is stored in the storage unit 104 and referred to via the data handling unit 110. The candidate destination is among a plurality of candidate destinations selected by the candidate destination selecting unit 112. Specifically, the unit-period frequency accumulating unit 115 accumulates a number of times that the moving object moved to the candidate destination during the unit period set by the period setting unit 113. For example, when the period setting unit 113 sets a unit period of "a week" which is assumed to start on Monday with regard to the "Rest A", the unit-period frequency accumulating unit 115 increments the frequency at every detection of moving to the "Rest A" from Monday. The accumulated frequency is reset to zero at the end of the unit period, that is, at the end of Sunday. The frequency is incremented from next Monday again at every detection of such moving.

Figure 15:
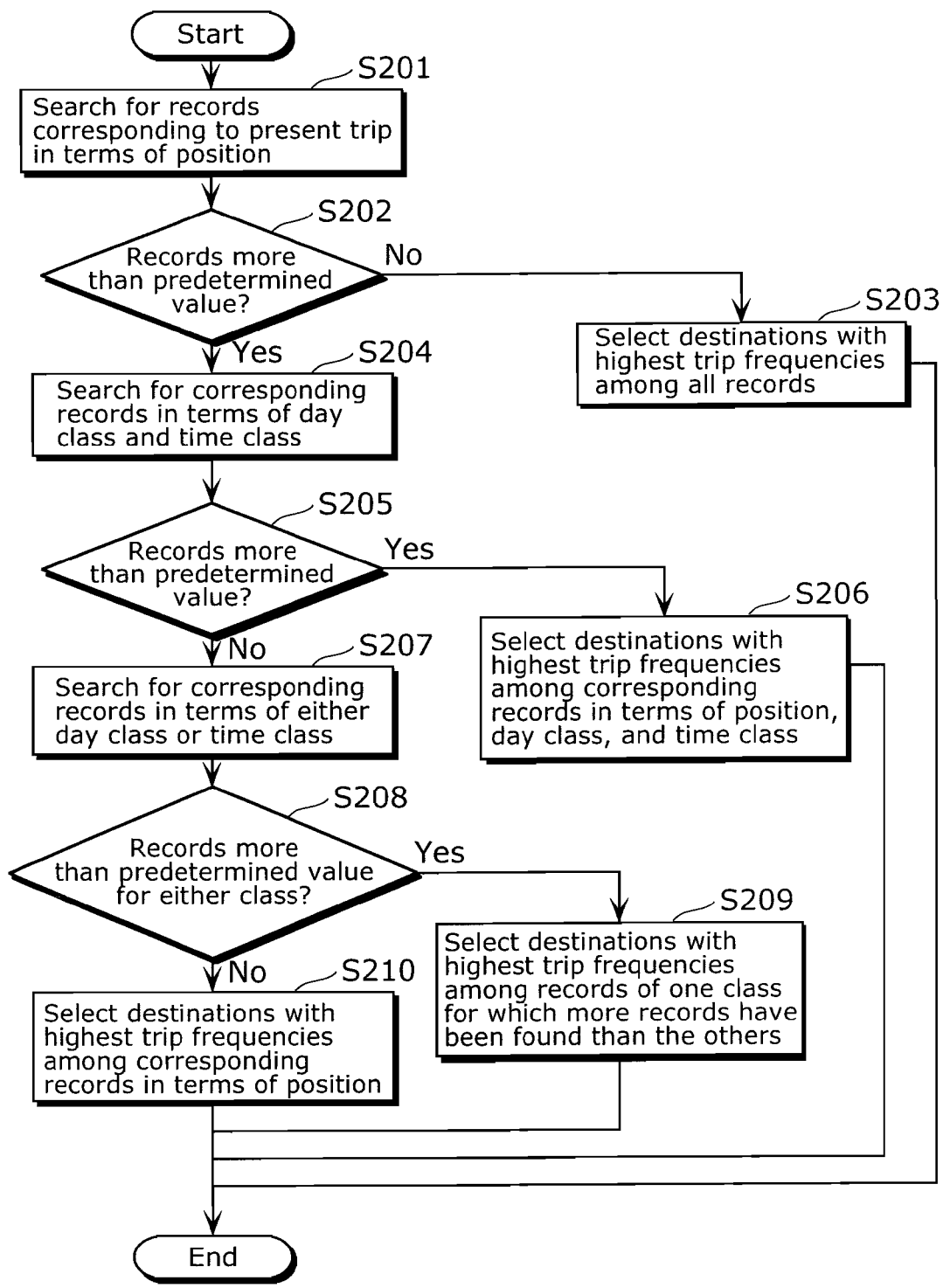
FIG. 15 is a flowchart that shows flow of process in which a candidate-destination selecting unit selects destinations.

FIG. 15 is a flowchart that shows process of the candidate-destination selecting unit 112 in detail. The number of candidates in the flowchart is assumed to be five.

First, the candidate-destination unit 112 refers to the trip history data 109 stored in the storage unit 104 via the data handling unit 110 in order to search for records corresponding to the present trip in terms of the position when the engine is started or the position information of the vehicle has become mismatched from the output from the matching unit 111 (for example, when the vehicle has moved from a link of an ID 5 to a link of an ID 3) (S201). The candidate-destination unit 112 then searches the history for records that has the same position information of the vehicle as the present position information in the case where the engine is started, and for records that share both a start point and a route LIP to the present position of the vehicle with the present trip in the case where the position information has become mismatched.

When the number of the corresponding trip records is not more than a predetermined value (for example, ten) (No in S202), the candidate-destination selecting unit 112 refers to the entire trip history data 109 and selects destinations with the five highest trip frequencies among all the records there as candidate destinations (S203), and then ends the process.

On the other hand, when the number of records of the corresponding trip is not less than the predetermined value (Yes in S202), the candidate-destination selecting unit 112 further searches the records retrieved in the step S201 for corresponding records in terms of both a day class and a time class (S204). The day class and the time class are described below with reference to FIG. 16. Such classes are used to grasp a given case with a wider concept. There are day classes such as "weekdays" class and a "days-off" class. The "weekdays" class contains instances of Monday, Tuesday, Wednesday, Thursday, and Friday. The "days-off" class contains instances of Saturday and Sunday. There are four time classes of a "late night" class, a "morning" class, an "afternoon" class, and an "evening" class. The "late night" class is set to range from 0:00 to 6:00, the "morning" class from 6:00 to 12:00, the "afternoon" class from 12:00 to 18:00, and the "evening" from 18:00 to 24:00. Given a case of "11:58 on Monday", a corresponding day class is the "weekdays" class, and a corresponding time class is the "morning" class. Given a case of "12:30 on Monday", a corresponding day class is the "weekdays" class, and a corresponding time class is the "afternoon" class. The candidate-destination selecting unit 112 refers to class definitions as shown in FIG. 16 so as to search for a record that is of corresponding day and time classes.

When history records not less than a predetermined value are retrieved in the step S204 (Yes in S205), the candidate-destination selecting unit 112 selects, as candidate destinations, destinations with the five highest trip frequencies among the records corresponding to the present trip in terms of the day class and the time class as well as the position, (S206), and then ends the process.

On the other hand, when the number of records is found not more than the predetermined value (No in S205), the candidate-destination selecting unit 112 searches the records retrieved in the step S201 and corresponding to the present trip in terms of the position for corresponding records in terms of either the day class or the time class (S207). When the number of corresponding records in terms of either of these classes are not less than a predetermined value (Yes in S208), the candidate-destination selecting unit 112 selects, as candidate destinations, destinations with the five highest trip frequencies among the records of one class for which more records have been found than the other class (S209), and then ends the process. When the number of records are found not more than a predetermined value for either class (No in S208), the candidate-destination selecting unit 112 selects, as candidate destinations, destinations of the five highest trip frequencies among the records retrieved in the step S201 and corresponding to the present trip in terms of the position (S210), and then ends the process.

The actual-frequency judging unit 116 judges whether or not the actual frequency satisfies the rule by judging whether or not the actual frequency specified by the unit-period frequency accumulating unit 115 has reached the frequency included in the rules with regard to each of the candidate destinations selected by the candidate-destination selecting unit 112. For this judgment, the actual-frequency judging unit 116 uses information regarding candidate destinations from the candidate-destination selecting unit 112, the rules for the frequency of a trip to each of the destination during the unit periods extracted by the rule extracting unit 114, and the actual frequency of the trip to each of the destinations during the unit periods counted by the unit-period frequency accumulating unit 115. Specifically, any of the following method is used for predicting a destination: In one method, among a plurality of candidate destinations, a prediction probability that the moving object moves to one candidate destination for which the rule is satisfied is reduced below a prediction probability of another candidate destination for which a rule is not satisfied. An order of the candidate destinations selected by the candidate-destination selecting unit 112 is thereby changed and the candidate destinations in the changed order are predicted to be a plurality of destinations. In another method, the candidate-destination selecting unit 112 changes an order of a plurality of candidate destinations by placing a lower priority on a candidate destination for which a rule is satisfied than when the rule is not satisfied for the candidate destination, or a higher priority on a candidate destination for which a rule is not satisfied than when the rule is satisfied for the candidate destination. In the other method, a candidate destination for which a rule is satisfied is excluded from a plurality of candidate destinations selected by the candidate-destination selecting unit 112 for the purpose of changing an order. Any of these plural methods may be implemented in a navigation apparatus alone or in a manner that allows the user to select one.

The drawing processing unit 117 executes process to draw on the display unit 106 information regarding a destination predicted by the actual-frequency judging unit 116 (in other words, given a final order) along with the map data 108. Specifically, the drawing processing unit 117 displays candidate destinations selected by the candidate-destination selecting unit 112 on the display unit 106 usually according to an ordering set by the candidate-destination selecting unit 112. But when the actual-frequency judging unit 116 has changed the order of the candidate destinations, the drawing processing unit 117 controls display on the display unit 106 in order to present the plurality of candidate destinations in the new ordering.

Figure 17:
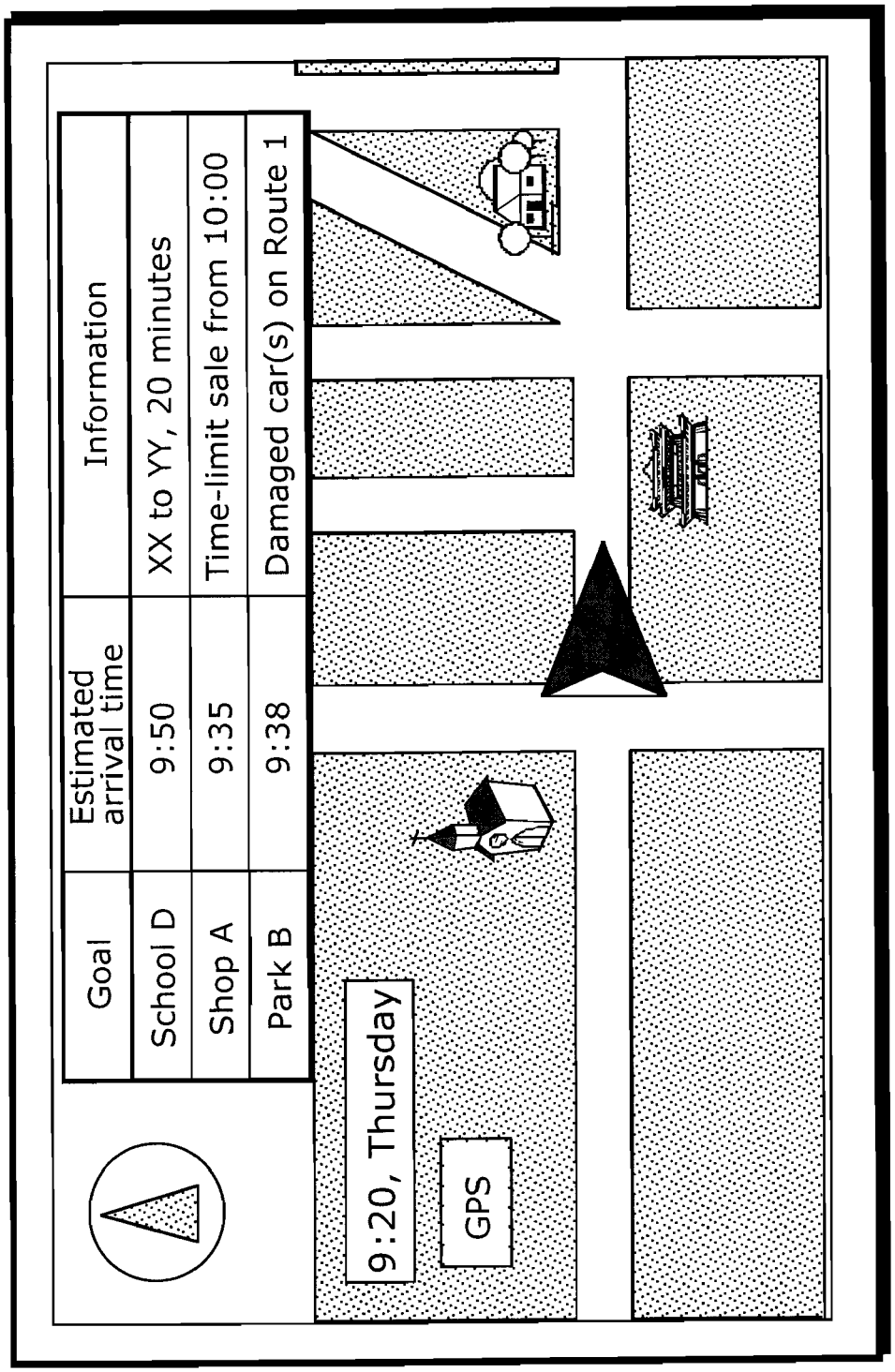
FIG. 17 shows an example of relevant information displayed on the display unit on the basis of a result of destination prediction according to the present invention.

An operation example of the actual-frequency judging unit 116 is described with reference to what is on the display unit 106 shown on FIGS. 17 and 18. The following conditions are assumed here. Present time is 9:20 on Thursday. The five most probable candidate destinations have been selected by the candidate-destination selecting unit 112: "School D", 20 times; "Shop A", 15 times; "Park B", 8 times, "Hospital F", 4 times; and "Shop B", twice. The rule extracting unit 114 has extracted a rule "four times for weekdays". The unit-period frequency accumulating unit 115 has accumulated frequency of the trip to the "Shop A" to "three times" for the week. The rule extracting unit 114 has extracted no rule for candidate destinations other than the "Shop A". The display unit 106 displays the three most probable candidate destinations with relevant information.

Under these conditions, the actual-frequency judging unit 116 first sets the five candidate destinations selected by the candidate-destination selecting unit 112 as candidates to display in a descending order of the frequencies. The actual-frequency judging unit 116 then checks for a rule extracted by the rule extracting unit 114 with regard to each of the candidate destinations. In this case, there is a rule "four times for weekdays" for the "Shop A". Finally, the actual-frequency judging unit 116 refers to the unit-period frequency accumulating unit 115 to find a frequency of "three times" for the trip to the "Shop A". This proves that the rule extracted by the rule extracting unit has not been satisfied yet with regard to any of the five destinations selected as candidate destinations. Accordingly, the actual-frequency judging unit 116 predicts as destinations (finally ordered destinations) the three most probable destinations among the ones selected by the candidate-destination selecting unit 112, the "School D", the "Shop A", and the "Park B".

The drawing processing unit 117 displays these destinations with relevant information on the display unit 106. FIG. 17 shows a display example. In the example shown in FIG. 17, the relevant information is displayed under names of estimated arrival time and notice. The trip history data 109 stores a route taken in the past to each destination. Calculating of the estimated arrival time and selecting of the notice are based on the length of the route or an average vehicle speed (for example, 80 km/h for expressways and otherwise 30 km/h) for the case where it is assumed that the user takes the route, as well as on traffic information or commercial information obtained through a VICS receiving unit or an information receiving unit from a network, which are not shown in FIG. 8, in the navigation apparatus.

Here are additional conditions that the user has moved to the "Shop A" in this trip, and that the user has started the vehicle at 9:10 on the following day, Friday. In this case, the five most probable candidate destinations selected by the candidate-destination selecting unit 112 are assumed as follows: "School D", 20 times; "Shop A", 16 times including one added trip; "Park B", 8 times; "Hospital F", 4 times; and "Shop B", twice. The rule "four times for weekdays" extracted by the rule extracting unit 114 still holds true for the "Shop A", while the unit-period frequency accumulating unit 115 updates the frequency for the "Shop A" to four times. The rule extracting unit 114 has extracted no rule for candidate destinations other than the "Shop A".

Under these conditions, the actual-frequency judging unit 116 first sets the five candidate destinations selected by the candidate-destination selecting unit 112 as candidates to display in a descending order of the frequencies. The actual-frequency judging unit 116 then checks for a rule extracted by the rule extracting unit 114 with regard to each of the candidate destinations. In this case, there is a rule "four times for weekdays" for the "Shop A". Finally, the actual-frequency judging unit 116 refers to the unit-period frequency accumulating unit 115 to find a frequency of "four times" for the trip to the "Shop A". This proves that the rule for the trip frequency has already been satisfied with regard to the "Shop A" among the five destinations selected as candidate destinations. Accordingly, the actual-frequency judging unit 116 predicts as destinations the three most probable destinations among the ones selected by the candidate-destination selecting unit 112, the "School D", the "Park B", and the "Hospital F", excluding the "Shop A". The drawing processing unit 117 displays these destinations with relevant information on the display unit 106.

Figure 18:
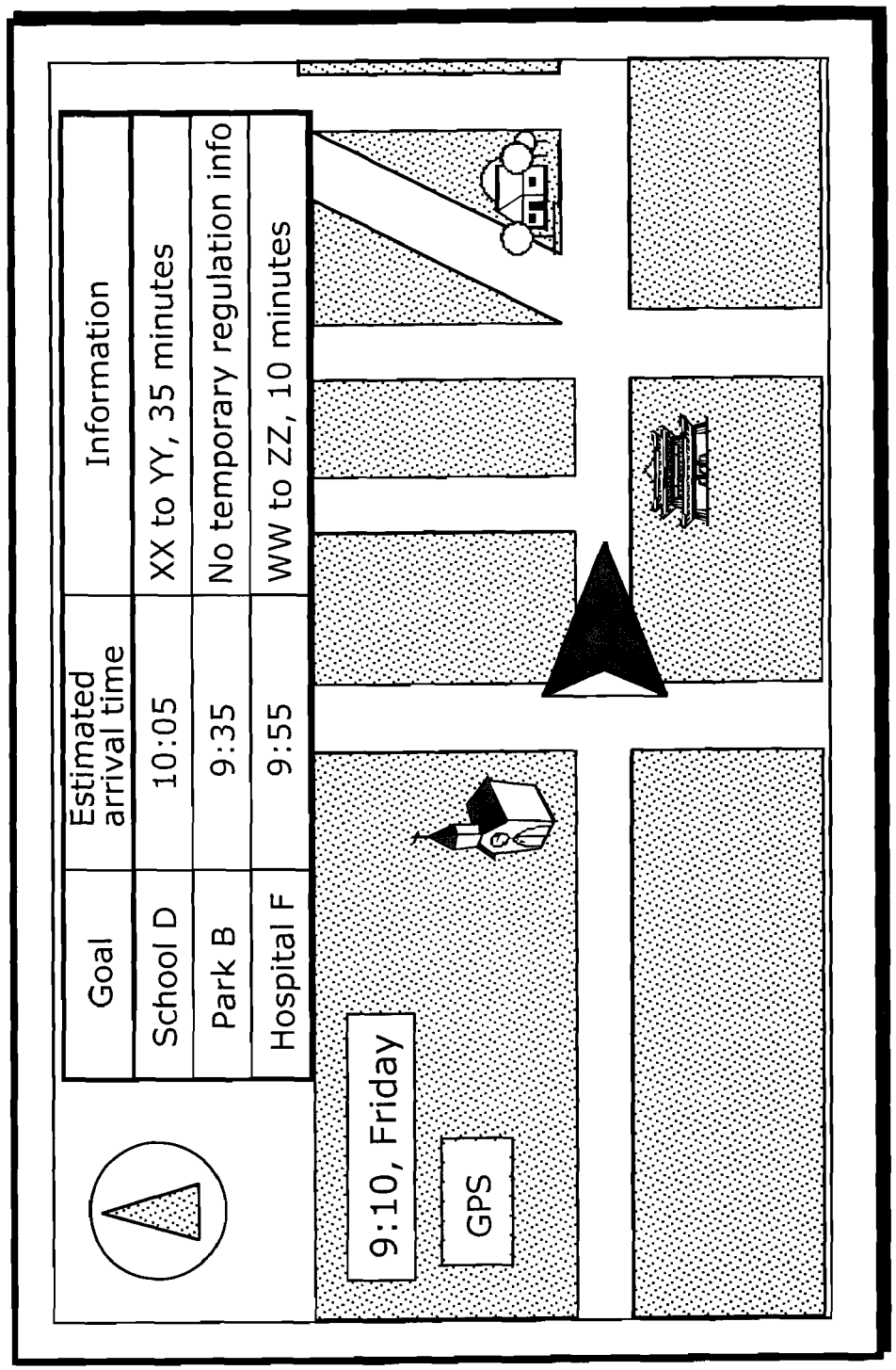
FIG. 18 shows an example of relevant information displayed on the display unit on the basis of a result of destination prediction according to the present invention.
Figure 19:
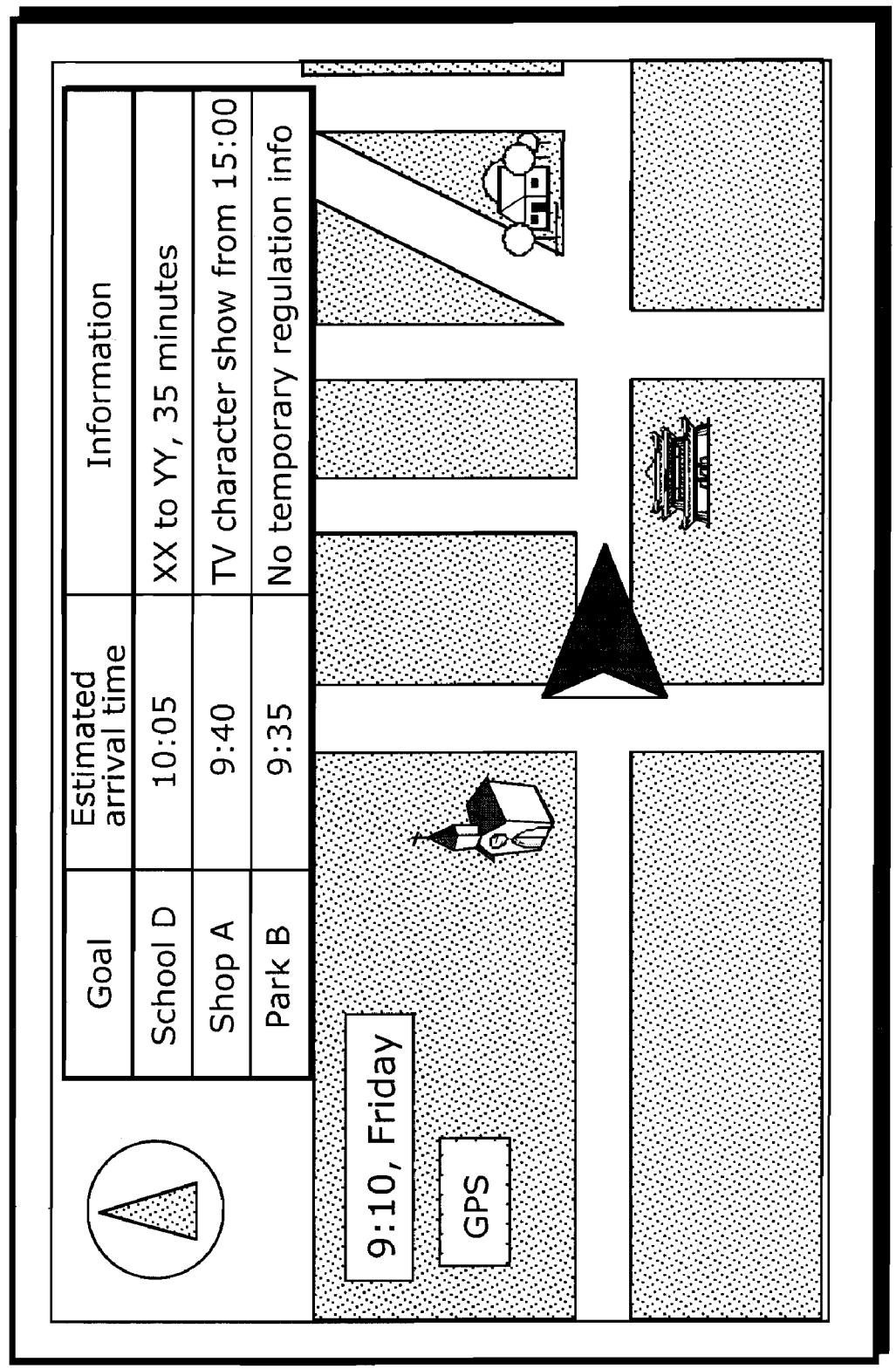
FIG. 19 shows an example of relevant information displayed on the display unit on the basis of a result of destination prediction according to the conventional technique.

FIG. 18 shows a display example for this case. For comparison, FIG. 19 shows a result of prediction which is based on only the trip frequency as in the case of the conventional technique. As shown in FIG. 19, information relevant to the "Shop A", which has low probability to be a goal on weekdays in the week, is displayed because a rule about frequency of trips to the destinations during the unit period are not taken into consideration. On the other hand, unlike FIG. 19, destinations and relevant information in FIG. 18, a display example according to the present invention, does not include information relevant to the "Shop A". This is because the rule about the frequency of the trips to the destinations during the unit period, that is, the rule that the user moves to the "Shop A" no more than "four times for weekdays" is taken into consideration despite that destinations selected as candidate destinations according to the trip frequency are the same.

The actual-frequency judging unit 116 thereby excludes a candidate destination that satisfies a rule from a plurality of the candidate destinations in order to change an order a plurality of candidate destinations selected by the candidate-destination selecting unit 112. The drawing processing unit 117 thus displays the plurality of candidate destinations remaining after the exclusion of a candidate destination by the actual-frequency judging unit 116.

The destination that satisfies the rule about the trip frequency may not be excluded from the display as in the first embodiment, but moved down in the order to be displayed. For example, as the rule has been satisfied with regard to the "Shop A" that is predicted to be the second most probable candidate in the first embodiment, the "Shop A" may be moved down to the third of the three candidates to be displayed on the display unit 106, with the "School D" at the top of the display, followed by the "Park B" and the "Shop A" at the bottom. To put it another way, the actual-frequency judging unit 116 thus change the order of the plurality of candidate destinations selected by the candidate-destination selecting unit 112 so that the candidate destination for which the rule has been satisfied will be displayed lower than the candidate for which the rule has not been satisfied yet.

Figure 20:
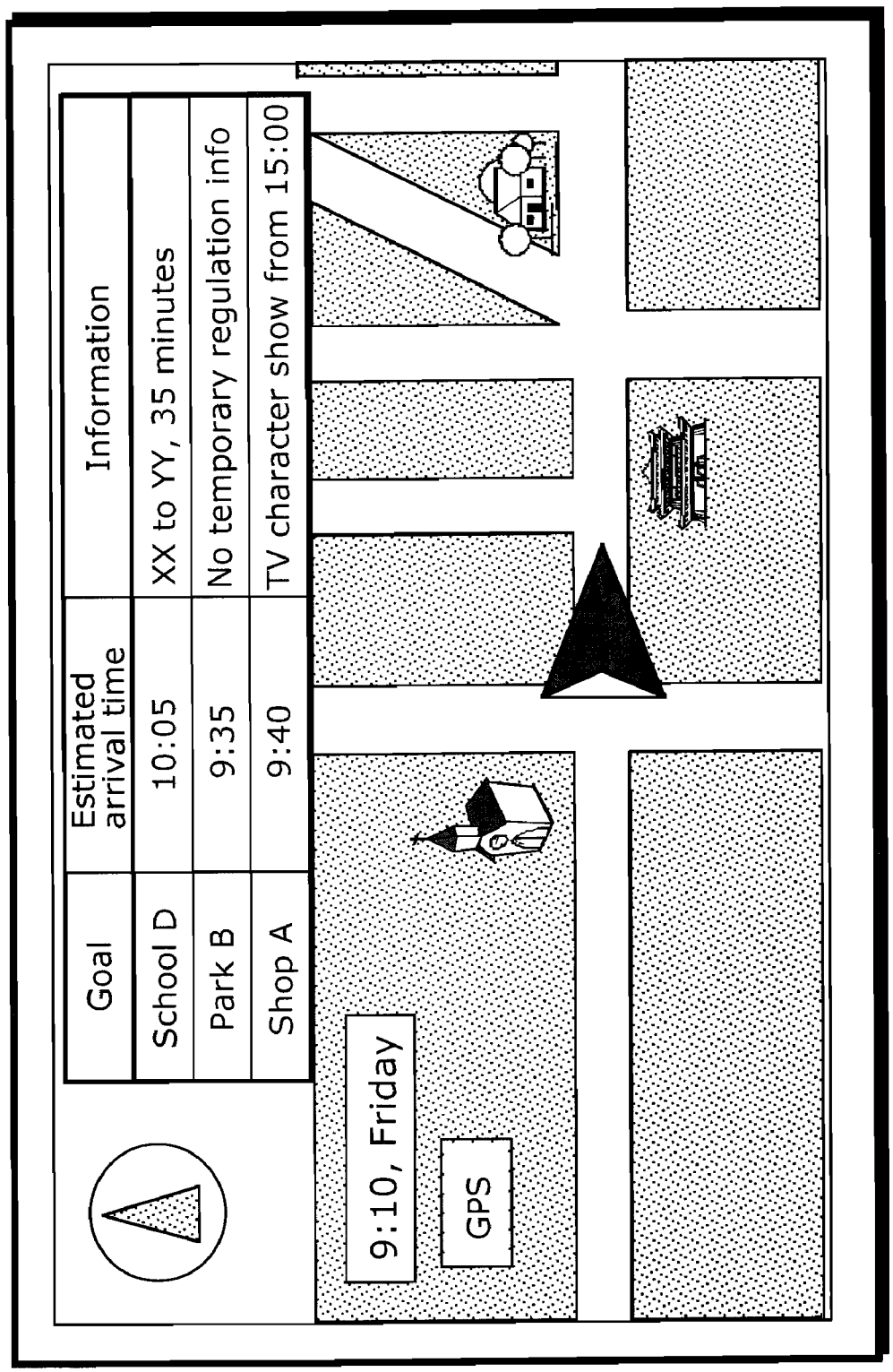
FIG. 20 shows an example of relevant information displayed on the display unit on the basis of a result of destination prediction according to the present invention.

FIG. 20 is a display example for this case. The candidate destination remains displayed even with decreased priority in FIG. 20 because the trip frequency for the destination is high enough under the conditions. This increases usability even in the case where tendency of frequency of a trip to a destination has changed but not been extracted as a rule yet.

Display priority may be also increased for a destination when a trip frequency rule for the destination has not been satisfied yet but another destination for which a trip frequency rule has been satisfied is displayed higher than the destination. This emphasizes to the user that there is still a destination for which the rule has not been satisfied yet.

Figure 21:
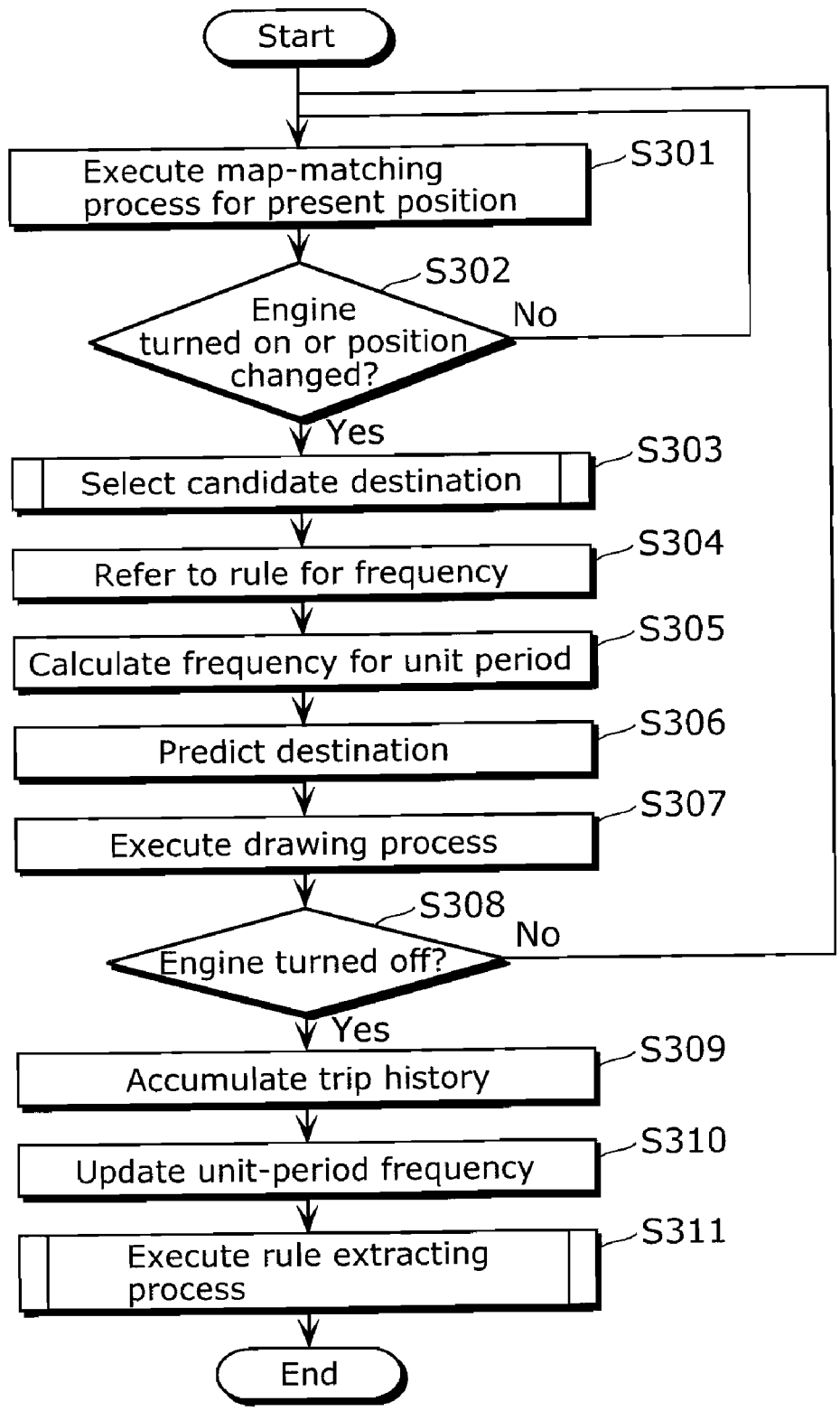
FIG. 21 is a flowchart that shows flow of process from a start of a trip to its end by a navigation apparatus according to the first embodiment of the present invention.

The following is a description of a process flow by the navigation apparatus 101 from a start of a trip to its end with reference to a flowchart in FIG. 21. The navigation apparatus 101 is configured as described above.

The matching unit 111 executes map-matching process when the position detecting unit 103 detects position information (S301). In the case where the engine in the vehicle is detected turned on or position of the vehicle changed (into a link with a different ID, for example) (Yes in S302), the candidate-destination selecting unit 112 refers to the day-and-time information detected by the day-and-time detecting unit 102, a present position (or a trip route up to the present position) map-matched by the matching unit 111, and the trip history data 109 in order to select candidate destinations for the current trip (S303). When candidate destinations are selected, the actual-frequency judging unit 116 refers to the rule extracting unit 114 for a rule for frequency of trips to destinations in a group of the candidate destinations (S304). Meanwhile, the actual-frequency judging unit 116 refers to the unit-period frequency accumulating unit 115 for frequency at which the trip to the candidate destinations has been made during unit periods (S305).

The actual-frequency judging unit 116 predicts a destination on the basis of outputs from the candidate-destination selecting unit 112, the rule extracting unit 114, and the unit-period frequency accumulating unit 115. The drawing processing unit 117, following the prediction, executes drawing process for the display unit 106 (S307). It is then judged whether or not the engine is turned off. In the case where the engine is still running (No in S308), the process is repeated from the step S301. In the case where the engine is turned off (Yes in S308), the data handling unit 110 accumulates the trip in the trip history data 109. When the destination is a place stored in the unit-period frequency unit 115, the data handling unit 110 increments the value by one (S310), and the period setting unit 113 and the rule extracting unit 114 executes process for updating the rule (S311).

The process of steps S309 to S311 can be executed when the navigation apparatus is provided with electricity after the engine is stopped. This process, however, may be executed in the next trip after the engine is started again if the navigation apparatus is provided with electricity or, even when provided with electricity, not in operation.

In the first embodiment, the period setting unit 113 judges whether or not there is a constant trip frequency for "a day", "weekdays or days-off", and "a week" in the period rule data 120 that is used for setting unit periods. The judging process is executed advancing from "a day", the shortest period, then "weekdays or days-off", to "a week" the longest, because of the following advantage: First, the trip frequency rules for these unit periods are not exclusive mutually. In other words, both of the rules "once a day" and "seven times in a week" may be satisfied for a landmark A. For "a week" from Monday to Sunday, the user is predicted, on the basis of the rule of "once a day", to make a trip to the landmark A with a high probability in a trip made on a Monday evening when the user has not been to the landmark A. Providing information relevant to the landmark A will be convenient to the user. Such information will be deduced and provided for the user on a daily basis, on Tuesday, Wednesday, and days to come as well. On the other hand, under the rule of "seven times in a week", the user who starts a trip on a Friday evening after four trips to the landmark A in the week will be provided with no useful information because of the probability that the user will make three remaining trips to there in the weekend. This is the reason giving priority to extracting a rule for a unit period as short as possible is more beneficial.

The method for selecting a candidate destination by the candidate-destination selecting unit 112 is not limited to the method described in the first embodiment. The method may be the predicting method described in Patent Reference 1 or the method such as disclosed in Japanese Patent No. 3722229 (Patent Reference 2) as a method for prediction with a good accuracy.

Although predicted destinations described in the first embodiment are landmarks which will be goals of the trips by the users, destinations are not limited to such landmarks. The destinations may be links (in other words, segments of roads) or nodes (branching points such as intersections). In the case where information of cities, towns, or villages in which the landmarks, links, or nodes are located is available as reference, destinations to be predicted may include names, such as "Osaka City" or "in or near Kyoto city".

When a frequency calculated by the unit-period frequency accumulating unit 115 satisfies a frequency rule, which is extracted by the rule extracting unit 114, for a candidate destination selected by the candidate-destination selecting unit, the actual-frequency judging unit 116 may instruct the drawing processing unit 117 to display a message to inform accordingly. For example, when a rule for the "Shop A" is "four times in a week" and the five most probable candidates selected by the candidate-destination selecting unit 112 includes the "Shop A", the actual-frequency judging unit 116 may exclude the "Shop A" from the candidate destinations and the drawing processing unit 117 may output a message shown in FIG. 22 to the display unit 106. The user will be thus reminded that the rule has been already satisfied and avoid a useless trip even when the user is making a trip while being ignorant of it.

Second Embodiment

The second embodiment of the present invention is described below.

The first embodiment shows an example where the rule extracting unit 114 extracts a rule of frequency using a unit period which is set by the period setting unit 113 and for which frequency of a trip to a destination is constant. The second embodiment describes another method in which the rule extracting unit 114 extracts a rule.

Figure 23:
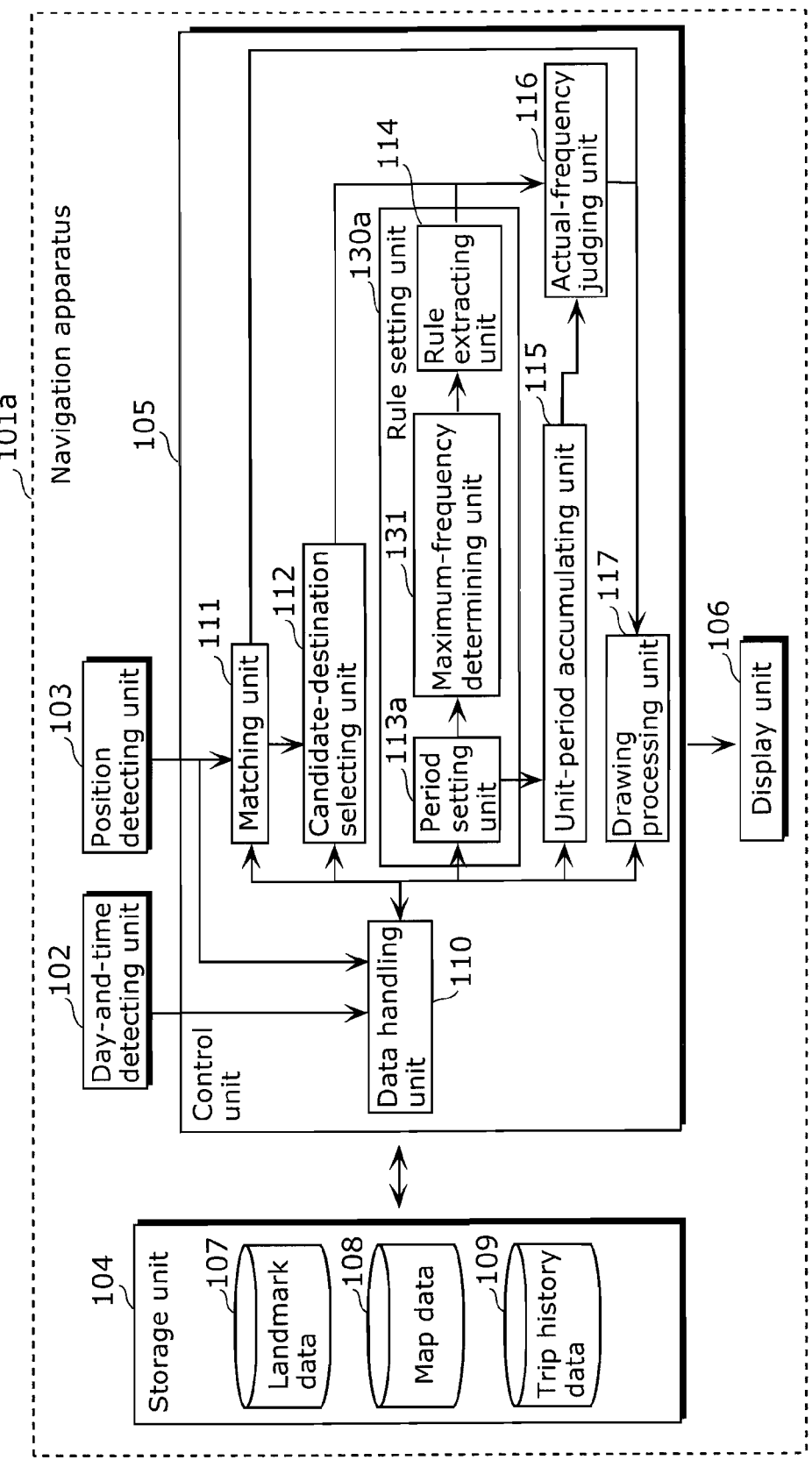
FIG. 23 is a configuration of a navigation apparatus according to the second embodiment of the present invention.

FIG. 23 shows a configuration of a navigation apparatus 101a according to the second embodiment. As in the one in the first embodiment, the navigation apparatus 101a is a car navigation apparatus capable of predicting a destination with a high accuracy using regularity of a user (or a moving object) that moves to a destination at a constant trip frequency in a certain unit period. This navigation apparatus includes a day-and-time detecting unit 102, a position detecting unit 103, a storage unit 104, a control unit 105, and a display unit 106.

Also the second embodiment describes an example of a destination-prediction apparatus according to the present invention where the destination-prediction apparatus is applied to the navigation apparatus 101a. Components that function similarly in the navigation apparatus 101 in the first embodiment are numbered the same and given no description in detail.

In the second embodiment, the rule setting unit 130 (the period setting unit 113 and the rule extracting unit 114) of the navigation apparatus 101 according to the first embodiment is substituted by a rule setting unit 130a (a period setting unit 113a, a maximum-frequency determining unit 131, and a rule extracting unit 114) as shown in FIG. 23.

The period setting unit 113a is a processing unit that sets a unit period to specify a rule. In the second embodiment, the unit period is predetermined. The period setting unit 113 extracts a period for which frequency of a trip to each destination is constant in the first embodiment, whereas the period setting unit 113a predetermines units to be used. There are four predetermined periods assumed in this case: "a day", "weekdays", "days-off", and "a week". Specifically, the period setting unit 113a according to the second embodiment constantly sets the four periods of "a day", "weekdays", "days-off", and "a week" instead of searching for a unit period for which trip frequency is constant by analyzing the trip history data 109.

The maximum-frequency determining unit 131 is a processing unit that analyzes the trip history data 109 in order to determine a maximum frequency at which a moving object moves to a candidate destination during the unit periods set by the period setting unit 113a. The maximum-frequency determining unit 131 according to the second embodiment refers to trip history data about each destination stored in the trip history data 109 in order to calculate the maximum frequency of a trip to be used for rules to be extracted by the rule extracting unit 114.

Two examples of calculation by the maximum-frequency determining unit 131 are described below with regard to frequency of trip to the "Shop A" shown in FIG. 24.

(i) Calculating the Maximum Frequency During a Period

The maximum-frequency determining unit 131 calculates a frequency largest in the trip history data 109 that contains frequencies at which a moving object moves to a candidate destination during a unit period set by the period setting unit 113a. The maximum-frequency determining unit 131 then determines the calculated largest frequency as a maximum. Specifically, the maximum-frequency determining unit 131 refers to information on trip frequency shown in FIG. 24 and extracts the largest frequency of a trip to a destination during a predetermined period (a unit period set by the period setting unit 113a). For a period of "a day", three patterns of frequencies of zero, one, and two can be found. The largest among them is two; thus, a value of two is determined as the largest frequency for a period of "a day". Similarly, a value of five is determined for a period of "weekdays", a value of one for "days-off", and a value of five for a period of "a week".

(ii) Calculating the Most Frequent Frequency During a Period

The maximum-frequency determining unit 131 specifies numbers of occurrences of frequencies in the trip history data 109 that contains the frequencies at which a moving object moves to a candidate destination during a unit period set by the period setting unit 113a. The maximum-frequency determining unit 131 then determines a frequency having the largest number of occurrences as the maximum. Specifically, the maximum-frequency determining unit 131 refers to information on trip frequency shown in FIG. 24 and extracts the most frequent frequency of a trip to a destination during a predetermined period (a unit period set by the period setting unit 113a). For a period of "a day", the trip was not made on 12 days, but once on 14 days and twice on two days; thus, a values of one is determined as the most frequent frequency for a period of "a day". Similarly, a value of four is determined for a period of "weekdays". For a period of "days-off", the trip was not made in two weeks, but once in two weeks as well. The larger frequency value is selected for such cases. The most frequent frequency for the period of "weekdays" thus results in a value of one. Similarly, a value of five is determined for a period of "weekdays".

The rule extracting unit 114 generates a rule about trip frequency, on the basis of the maximum frequency calculated by the maximum-frequency determining unit 131, for each destination and each period set by the period setting unit 113a.

For example, rules generated using the method (i) for the "Shop A" are "up to twice a day", "up to once for weekdays", "up to once for days-off", and "up to five times a week".

The unit-period frequency accumulating unit 115 accumulates frequency at which a trip has been made for each destination and each predetermined period as in the first embodiment.

Figure 25:
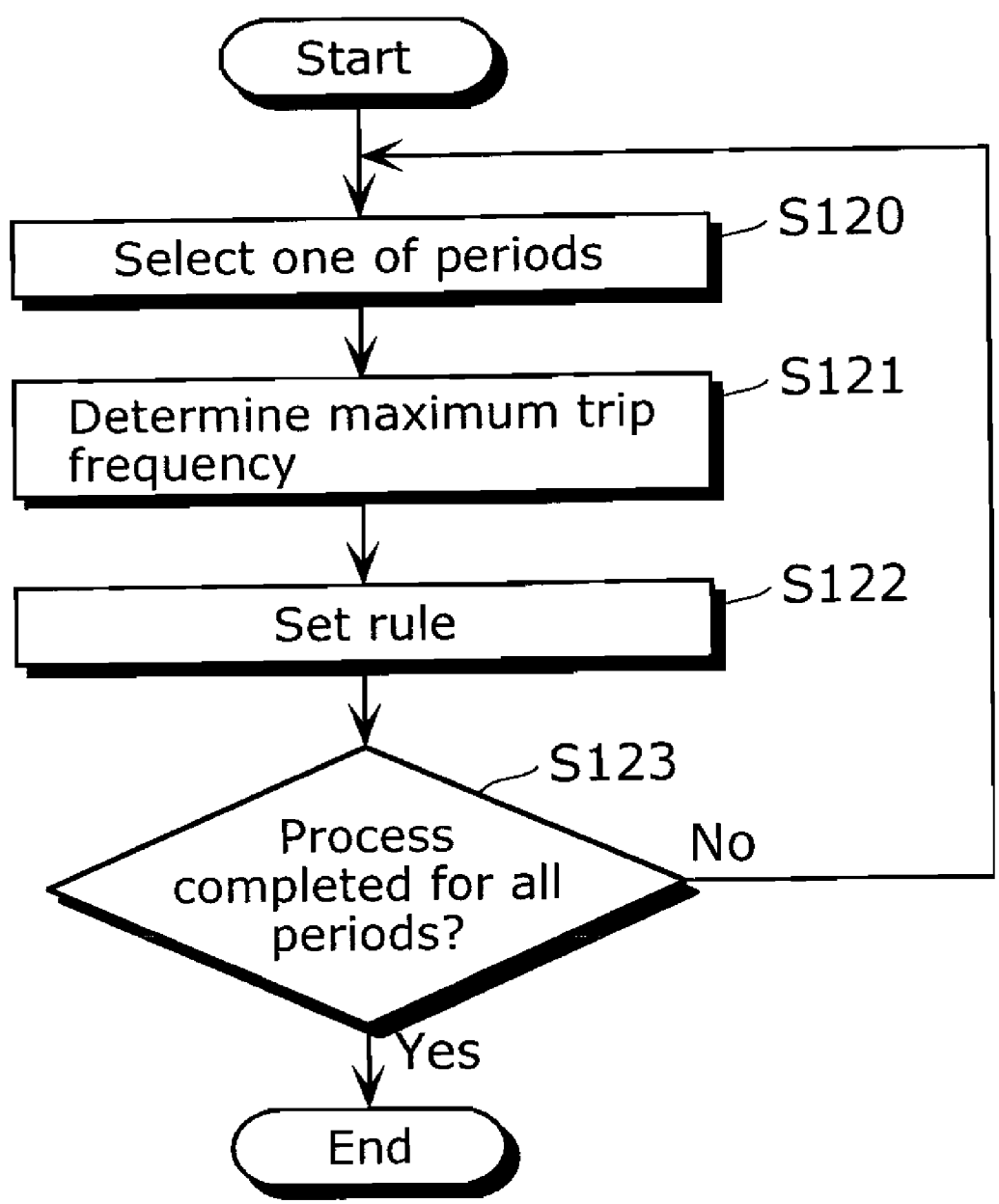
FIG. 25 is a flowchart that shows flow of process in which a rule is set according to the second embodiment of the present invention.

FIG. 25 is a flowchart that shows process of the rule setting unit 130a in the navigation apparatus 101a according to the second embodiment.

The period setting unit 113a selects one of the four periods "a day" "weekdays", "days-off", and "a week" as a predetermined period (S120).

The maximum-frequency determining unit 131 subsequently analyzes the trip history data 109 in order to determine a maximum frequency at which the moving object has moved to a candidate destination during the unit period selected by the period setting unit 113a (S121).

The rule extracting unit 114 then sets the period selected by the period setting unit 113a and the maximum frequency determined by the maximum-frequency determining unit 131 as a rule (S122).

Finally, the rule setting unit 130a judges whether or not rules have been extracted for all the predetermined periods ("a day", "weekdays", "days-off", and "a week") (S123). In the case where such rules have been extracted for all the periods (Yes in S123), the rule setting unit 130a ends the process. When this is not the case (No in S123), the process is repeated to extract a rule for a remaining period (the period setting unit 113a selects remaining one from the four periods, then the process above proceeds).

This is how rules about trip frequency, such as "up to twice a day", "up to five time for weekdays", "up to once for days-off", and "up to five times a week" about the "Shop A", are extracted for each destination and each predetermined period. The extracted rules are used in a similar marriner as in the first embodiment.

The rules extracted in the first embodiment and the rules extracted in the second embodiment are not necessarily exclusive mutually and both rules may be adopted together. For example, the rules "four times a week" and "up to once a day" may be applied to a rule for a destination together.

Further, in the examples of the first and second embodiments, the user is provided with information relevant to predicted destinations visually shown on the display. Such information may be also provided audibly, for example, as voice navigation through a speaker not shown in FIG. 8 or FIG. 28.

Further, the configurations described in the first and second embodiments have the storage unit 104 in the destination-prediction apparatus (or the navigation apparatus). The configurations may have storage unit 104 installed in a server on a network, and the data handling unit 110 that obtains data stored in the storage unit 104 through the network. Such a configuration will reduce the size of a main body of a destination-prediction apparatus and keep the landmark data 107 or the map data 108 up to date. This will reduce the total cost of the destination-prediction apparatus as well when a module necessary for communication costs less than the storage unit 104. However, this will necessitate an additional configuration to upload the data obtained by the day-and-time detecting unit 102 or the position detecting unit 103 of the destination-prediction apparatus to the server.

Third Embodiment

The third embodiment of the present invention is described below.

Figure 26:
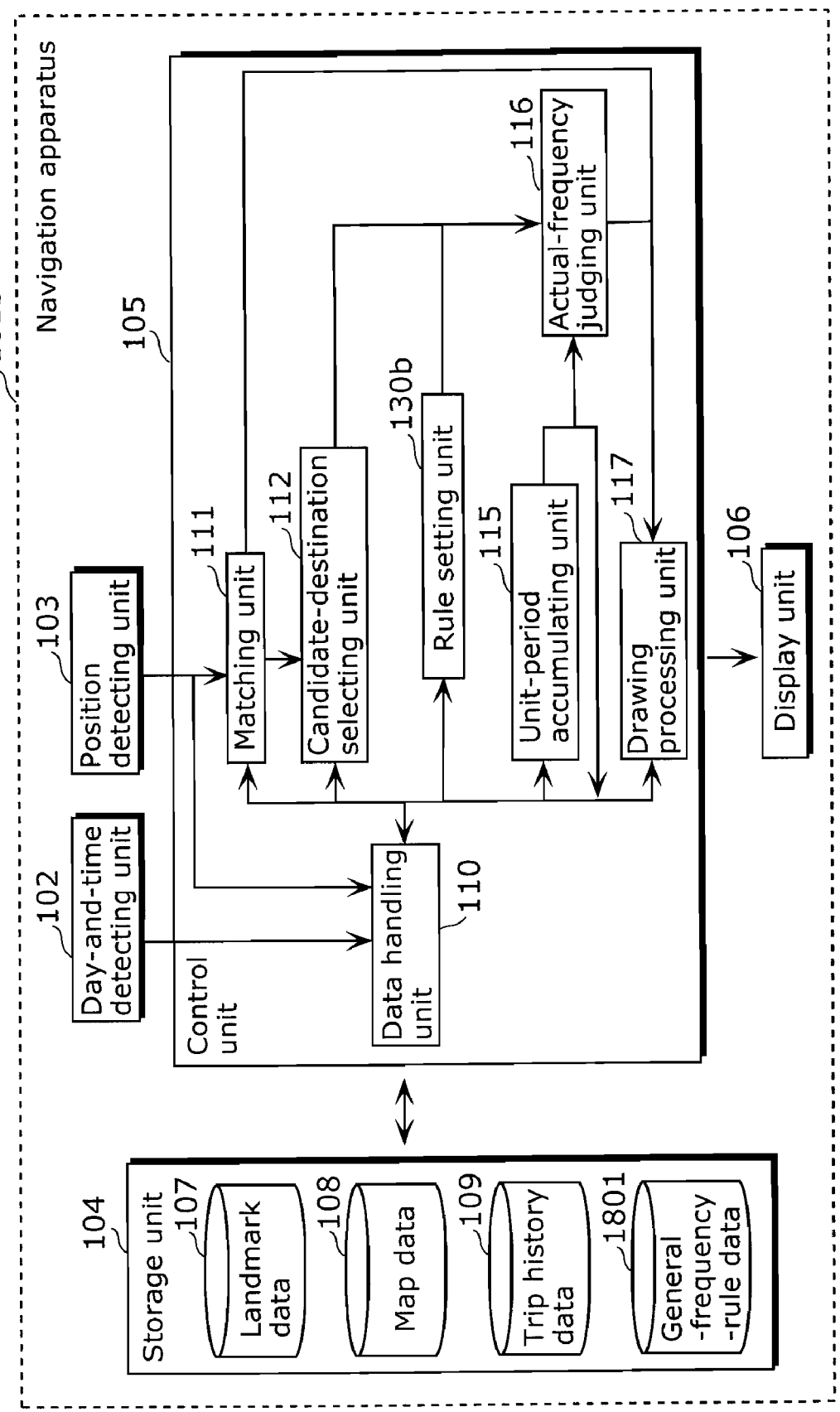
FIG. 26 is a configuration of a navigation apparatus according to the third embodiment of the present invention.

The first and second embodiments describe methods in which a rule for each user about trip frequency in a predetermined period is derived on the basis of a trip history of each user (or each moving object in which such apparatus is installed) and the rule is used for prediction of a destination. The third embodiment describes a method in which a destination is predicted not using a history that is based on an individual history but a general rule about trip frequency for each destination. FIGS. 8, 23, and 26 show configurations of a navigation apparatus 101b according to the third embodiment. As in the one in the first embodiment, the navigation apparatus 101b is a car navigation apparatus capable of predicting a destination with a high accuracy using regularity of a user (or a moving object) that moves to a destination at a constant trip frequency during a certain unit period. This navigation apparatus includes a day-and-time detecting unit 102, a position detecting unit 103, a storage unit 104, a control unit 105, and a display unit 106.

Also the third embodiment describes an example of a destination-prediction apparatus according to the present invention where the destination-prediction apparatus is applied to the navigation apparatus 101b. Components that function similarly in the navigation apparatus 101 in the first embodiment are numbered the same and given no description in detail.

The third embodiment differs from the first embodiment in that the storage unit 104 is provided with general-frequency-rule data 1801 and a rule setting unit 130b.

The storage unit 104 contains the general-frequency-rule data 1801 that indicates a general rule for a predetermined category of destinations, the rule that a moving object moves to the destinations at a trip frequency during a unit period.

The rule setting unit 130b refers to the general-frequency-rule data 1801 in order to judge whether or not there is a rule about a candidate destination selected by the candidate-destination selecting unit 112. When there is such a rule, the rule setting unit 130b specifies a unit period and trip frequency of the rule to extract it.

FIG. 27 shows an example of the general-frequency-rule data 1801 stored in the storage unit 104. The general-frequency-rule data indicates a trip frequency rule for each destination during a predetermined period. The trip frequency rule data is prepared manually in view of common assumption or calculated statistically on the basis of people's actual movement. FIG. 27 indicates that a trip to a destination categorized as "Gas stations" was made only once for a period of "a day" and for a period of "a week" as well. A field for "a month" has "—" that indicates that there is no applicable rule. That there is no applicable rule means that frequency of a trip to "Gas stations" in "a month" generally fluctuates, such as once, twice, or more, depending on frequency at which users use their vehicles.

FIG. 27 also shows that the same rule holds true for a category of "Fast food places". The ">3" in a field of "Learning centers" for "a month" means that many users are found to move to there in a period of "a month". The category mentioned here is equivalent to the categories stored in the facility data in FIG. 10(A).

Figure 28:
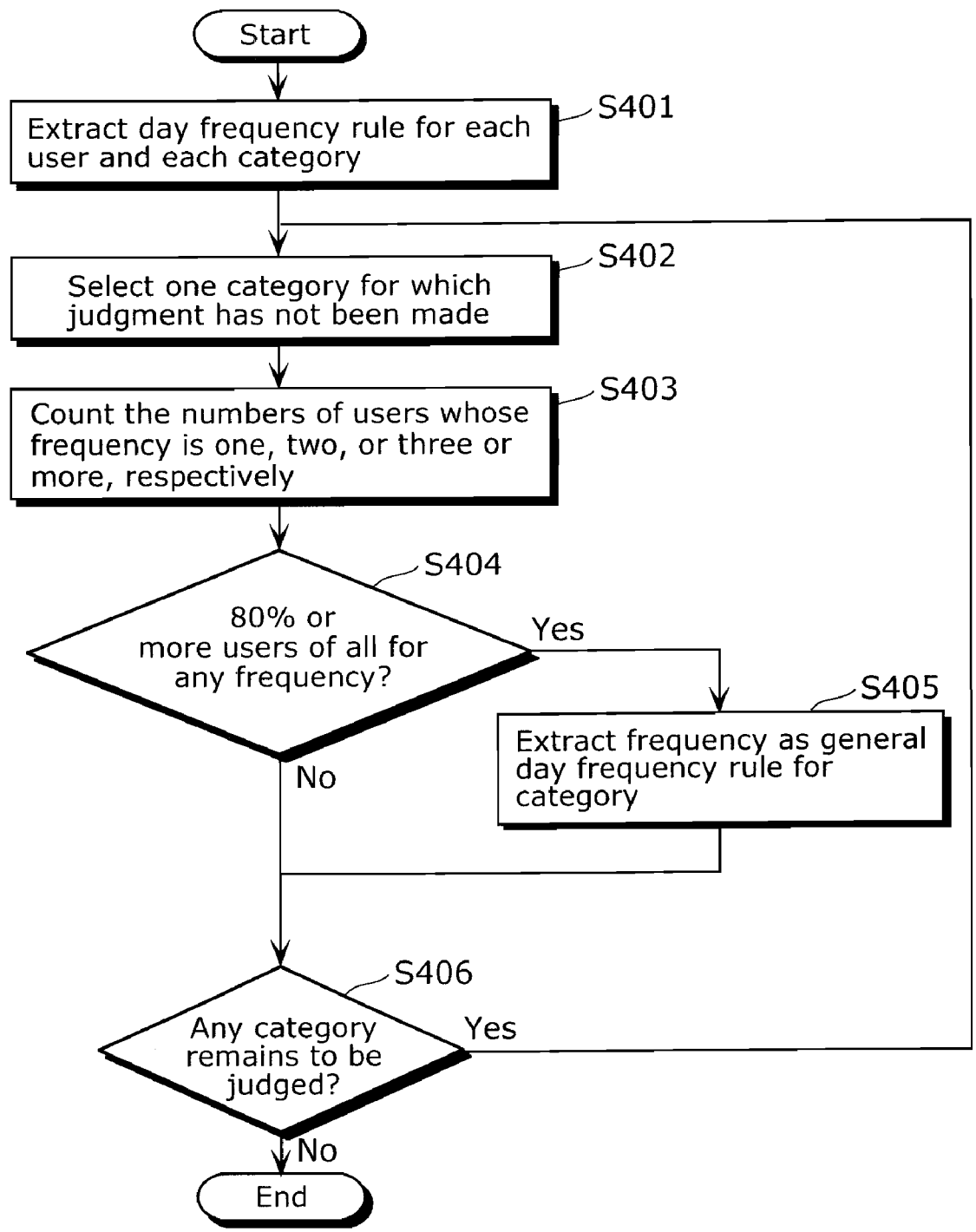
FIG. 28 is a flowchart that shows flow of process in which the general-frequency-rule data is statistically calculated according to the third embodiment of the present invention.

A method to generate such a general frequency rule not manually in view of common assumption but statistically is described below. For example, a history of information about positions to which a trip has been actually made as stored in the trip history data 109 according to the present invention may be used as a reference for people's movement used in the method. Process flow, for example, a method in which a computer automatically generates the general-frequency-rule data 1801 is specifically described with reference to a flow chart in FIG. 28. FIG. 28 illustrates that a rule about trip frequency is extracted for a unit period of "a day" and each category in FIG. 28. Such a rule may be extracted for a unit period such as of "a week" or "a month" as well.

Figure 29:
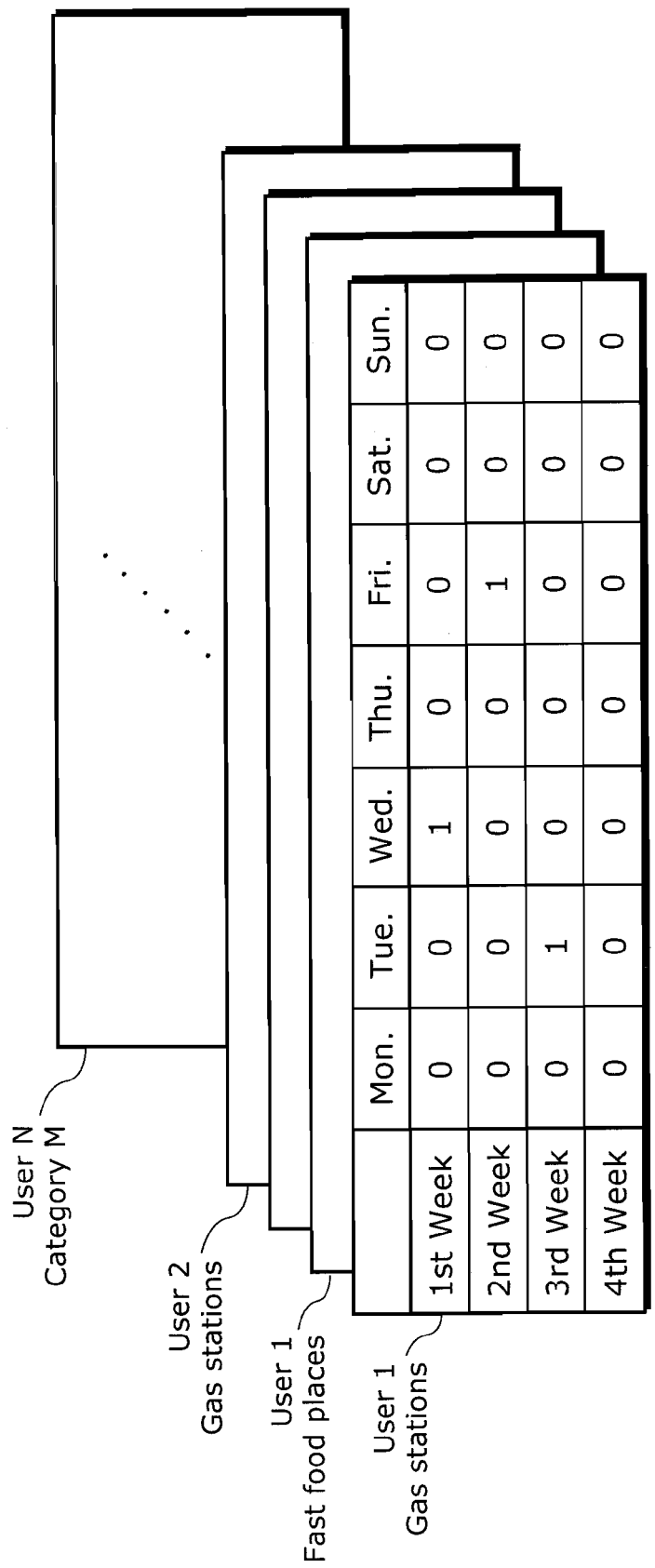
FIG. 29 shows examples of actual histories of trips for each user and each destination in a predetermined period.

First, a daily-trip-frequency table of four weeks, as shown in FIG. 29, is generated for each of the users and each of the categories in a scope of statistics. A rule about trip frequency is then extracted for each of the users and each of the categories in the scope (S401). FIG. 29 can be read in the same manner as FIGS. 14 and 24. The method for extracting the rule can be conceived as the one used in the maximum-frequency determining unit 131 or the one in the rule extracting unit 114 in the second embodiment. Here described is the case where the method "(i) Calculating the maximum frequency during a period" is applied.

Through this process, a group of rules are extracted such as that User 1 makes a trip once a day and that User 2 also makes a trip once a day with respect to the category "gas stations", or that the User 1 makes a trip once a day and that the User 2 makes a trip twice a day with respect to the category "fast food places". One of the categories in these extracted rules (for example, gas stations in the example in FIG. 29) is selected (S402). Then, numbers of the users who make their trips once a day, the users who make their trips twice, and the users who make their trip three times or more with respect to the extracted category are counted respectively (S403). FIG. 30 shows a result of the counting. According to FIG. 30, there are 29 users to make their trips to gas stations once a day, but no users to make their trips twice or three times or more. The values in FIG. 30 are based on actual movements of 29 people sampled for an experiment for collecting trip histories conducted by the inventors.

When the numbers of users have been counted, it is judged whether or not the number of users with any of the frequencies, one, two, or three or more, is large enough compared to a predetermined number (for example, 80% of or more than a total number of the users) (S404). For gas stations, the total number of the users with frequencies one, two, and three or more is 29. All of them fall under the frequency of "one"; thus, the condition is judged to be satisfied. In the case where the condition is satisfied (Yes in S404), the frequency is extracted as a general frequency rule for the corresponding category and period (S405). Rules extracted in such a process are shown in FIG. 27. After the rule for gas stations is extracted, it is judged whether or not there remains a category for which the judgment has not been made. In the case where there does, the process returns to a step S402 to follow the steps ahead.

In the case where it is judged no in the step S404, for example, in the case in FIG. 30 where 11 people made their trips once and 11 people made their trips twice to fast food places in "a month", the number of the users with neither of these trip frequencies is more than 80% of the total number of the users, 22, the process advances to S406. The rule-extracting process is completed when such judgments have been made for all the categories.

Such process can be executed for periods of "a week" and "a month" as well though the steps above. FIG. 30 is an excerption from statistically processed data of the 29 subjects. FIG. 27 shows excepted rules that have been extracted from this data.

The general-frequency-rule data 1801 preliminarily stores trip frequency rules extracted manually or statistically as described above for respective destinations and predetermined periods. The general-frequency-rule data 1801 may be newly stored or updated via a network when the navigation apparatus 101b has a communication unit not shown in FIG. 26.

Figure 31:
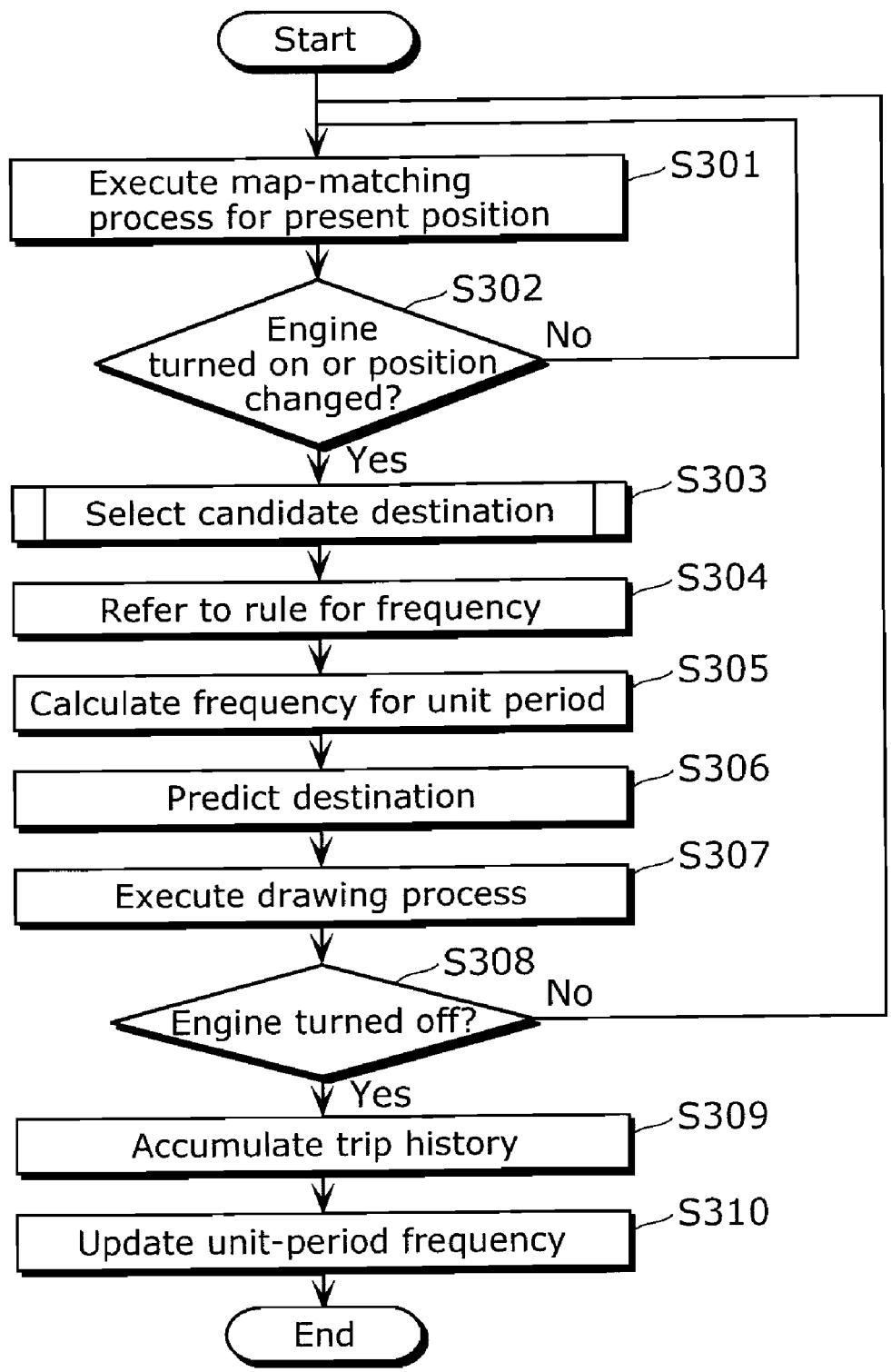
FIG. 31 is a flowchart that shows flow of process from a start of a trip to its end by a navigation apparatus according to the third embodiment of the present invention.

FIG. 31 is a flowchart that shows a process flow by the navigation apparatus 101b according to the third embodiment from a start of a trip to its end. The process flow is almost the same as shown in the flowchart in FIG. 21 for the first embodiment but is different only in that this process flow lacks the rule extracting process in the step S311. This is because, as mentioned above, that the process in the step 311 is for extracting a rule of trip frequency for each user, and the third embodiment does not have this process. In other words, not a rule for each user (or each moving object) but only a prepared, general rule independent from a specific user is adopted (referred to by the rule setting unit 130b) in the third embodiment.

Because a trip history of a specific user is not necessarily needed for adopting a rule, using the general-frequency-rule data 1801 as in the third embodiment advantageously achieves prediction with a high accuracy even soon after the user has started using the destination-prediction apparatus according to the present invention, in other words, when the trip history of the user has not been accumulated. Further, a characteristic of a trip of the user may fluctuate dependent on days, weeks, or months. This may result in that a rule extracted only using trip frequency of each user follows the fluctuation and may become ineffective. In such a case, using a statistically reliable rule on the basis of actual trip histories of a plurality of users will contribute to more accurate prediction.

Although the third embodiment describes an example where a general frequency rule is for a category as a destination, such process may use a landmark or an intersection as a destination in order to have a similar effect.

The rules on the basis of a history of each user shown in the first and second embodiments and the rule extracted in the third embodiment are not exclusive mutually and may be used together. Specifically, predictions are made using general rules soon after the user has started using the destination-prediction apparatus, and the rules are replaced with rule of characteristics of user-specific trip frequencies as the user's history accumulates and rules, such as that the user moves to a gas station to which the user commutes by car six times a week, become obvious whereas the statistics show that general users move to gas stations only once a week. This will maintain high-accuracy of predictions from the beginning of use of the destination-prediction apparatus.

As shown in the description above, in order to achieve high-accuracy prediction, the destination-prediction apparatus according to the present invention predicts a destination on the basis of trip history data, taking two trip probabilities into consideration. One trip probability is based on past trip frequency under a condition similar to that of movement for which a destination is being predicted, and the other is based on a rule about frequency of a trip to a destination (such as a landmark, an intersection, or a road) in a predetermined period. This will make use of a finite display area efficiently and prevent the user from browsing or listening to unnecessary information by avoiding presenting such unnecessary information to the user visually or audibly, resulting in being very effective.

A destination-prediction apparatus according to the present invention is thus described on the basis of the first to third embodiments, but the present invention is not limited to these embodiments. The present invention also includes variations of the embodiments above and a different embodiment where the respective components in the first to third embodiments above are used in any combination unless they depart from the spirit and scope of the present invention.

For example, the actual-frequency judging unit 116, which changes ordering in a prediction depending whether or not a rule is satisfied for a candidate destination in the first embodiment, may change the ordering depending a remainder after subtracting an actual frequency from a trip frequency indicated by a rule even when the rule is not satisfied for the candidate destination. In other words, the ordering may be changed so that prediction probability of movement of the moving object to the candidate destination decreases more as the remainder after subtracting the actual frequency from the trip frequency indicated by the rule is smaller. Specifically, the actual-frequency judging unit 116 calculates a remaining period of a unit period after a present day and time detected by the day-and-time detecting unit 102, and then divides the remainder above by the calculated remaining period to have the remaining normalized using the remaining period. Following this, the actual-frequency judging unit 116 may change the ordering by the candidate-destination selecting unit 112 so that prediction probability of movement of the moving object to the candidate destination decreases more as the calculated, normalized remainder is smaller.

Figure 32:
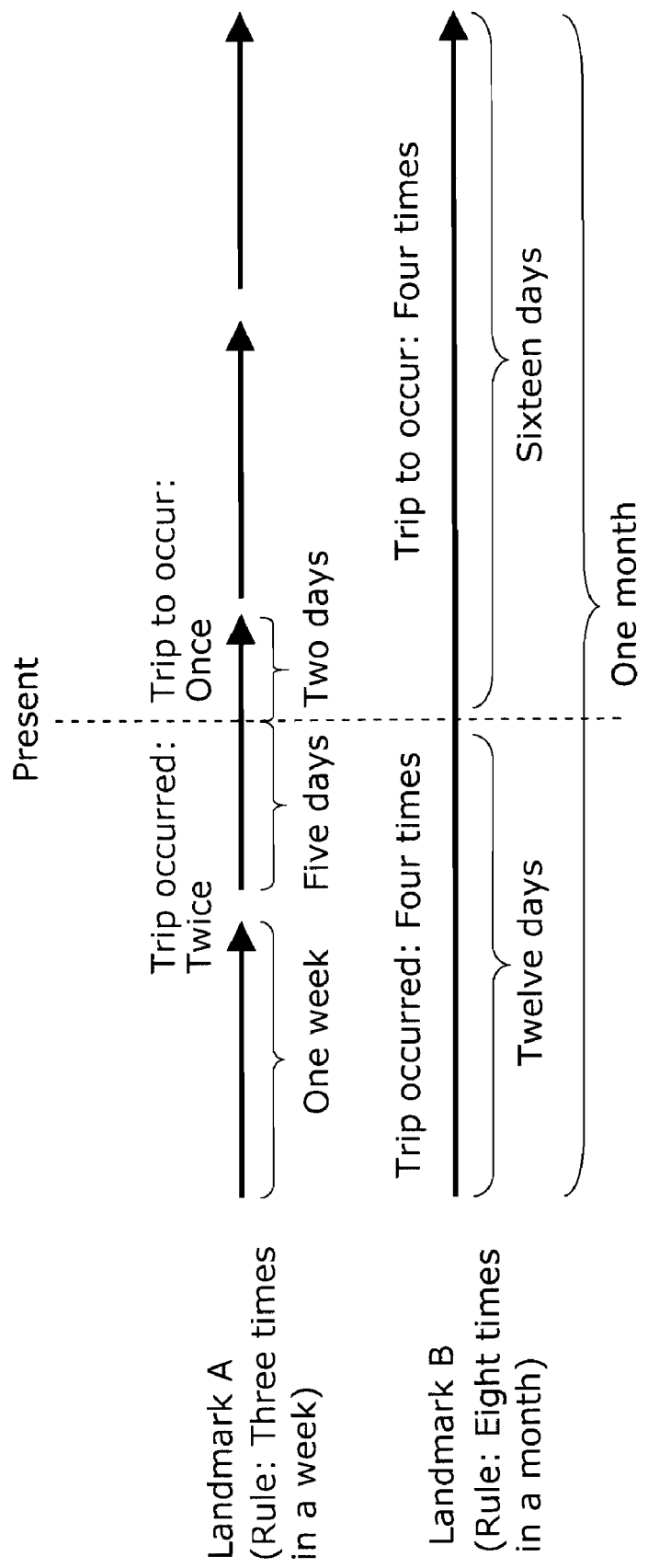
FIG. 32 illustrates a different destination-prediction method.

One specific example is as follows: FIG. 32 shows that there is a rule that a trip is made "three times in a week" for the landmark A, a candidate destination, and the trip has been made twice by the fifth day of a week. It is thus predicted that the trip to the landmark A will be made one more time in the remaining two days. Meanwhile, there is a rule that a trip to the landmark B, another candidate destination, is made "eight times in a month" and the trip has been made four times by the twelfth day of this month. It is thus predicted that the trip to the landmark B will be made four more times in the remaining sixteen days.

In this case, the actual-frequency judging unit 116 calculates a value by dividing the remaining trip frequency by the remaining days for each candidate destination for which there is a rule.

Landmark A: Once/two days=0.5

Landmark B: Four times/sixteen days=0.25

The actual-frequency judging unit 116 judges that the trip to the landmark with the larger quotient above has larger probability to be made, and predicts destinations with ordering according to the quotient values.

Landmarks can be determined dependently only on the remaining trip frequency when compared in view of the same unit period. When the quotients above are equal, the trip with less remaining days is preferably given a higher priority. For example, it is preferable that when a remaining frequency (eight times)/a remaining period (sixteen days)=0.5 for the landmark C, the landmark A with less remaining days is judged to have a higher prediction probability even though the quotient above is equal to that of the landmark A. This is because of the same reason as the reason for the "priority" in FIG. 12.

Here is another specific example for such remaining frequency and remaining periods. There are a rule that a trip is made "six times in a month" for a candidate destination, the "Shop C", and a rule that a trip is made "three times in a week" for another candidate destination, the "Shop D". A trip history for weekday mornings shows that there were a trip to the "Shop A" 30 times, a trip to the "Shop B" 25 times, a trip to the "Shop C" 20 times, and a trip to the "Shop E" 13 times.

An actual frequency for the "Shop C" shows that the trip to there has been made three times this month. There are 16 remaining days for the month. On the other hand, an actual frequency for the "Shop D" shows that the trip to there has been made twice in this week. There are two remaining days for the week.

With the remaining frequency of three and the remaining days of 16 for the "Shop C", the actual-frequency judging unit 116 calculates 3/16=0.1875. With the remaining frequency of one and the remaining days of two for the "Shop D", the actual-frequency judging unit 116 calculates 1/2=0.5. The actual-frequency judging unit 116 thus judges that trip to the "Shop D" has a higher prediction probability than the "Shop C" and the drawing processing unit 117 displays the "Shop D" higher than the "Shop C" on the display unit 106 according to the judgment.

Figure 33:
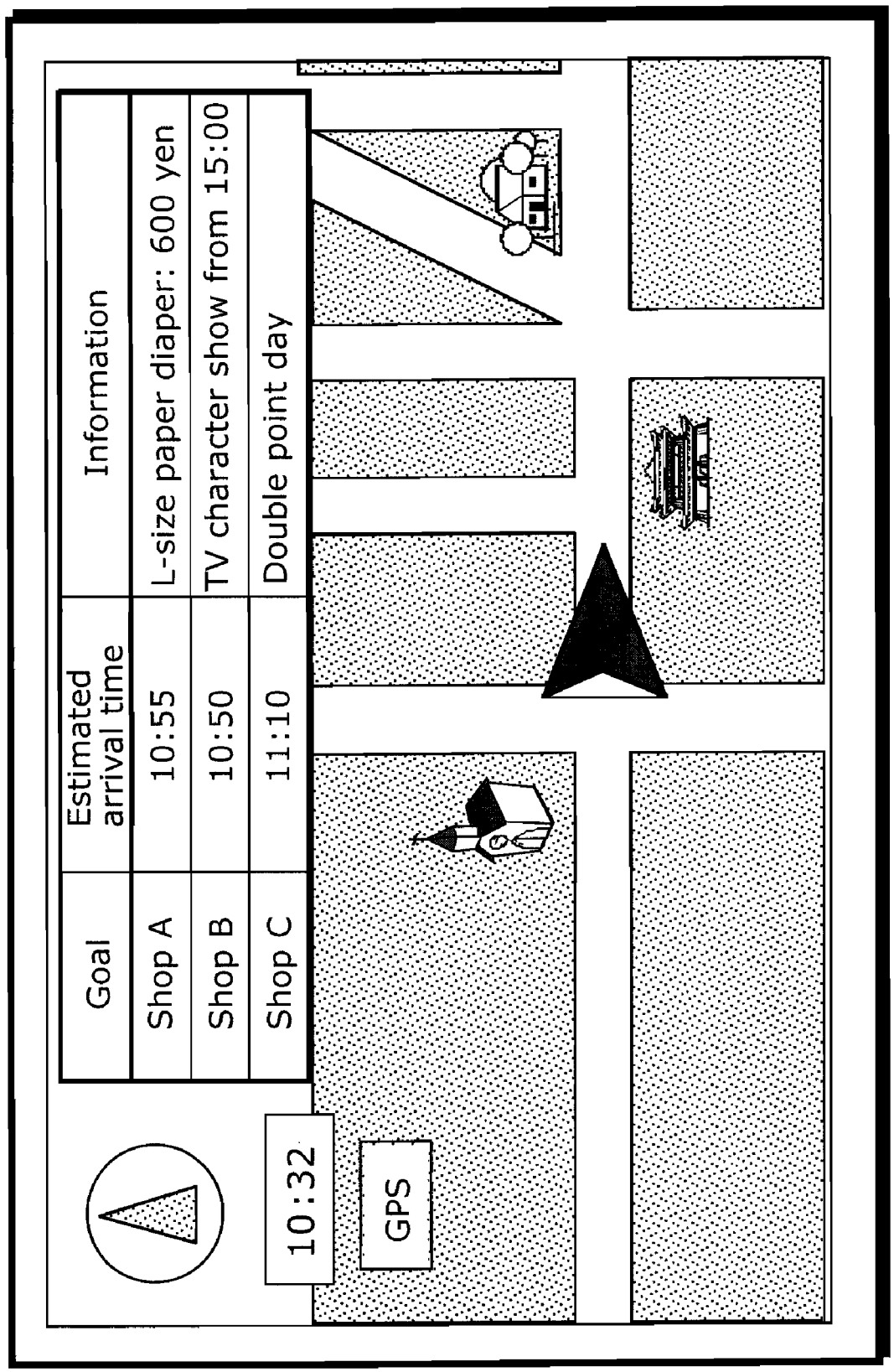
FIG. 33 shows an example of relevant information displayed on the display unit on the basis of a result of destination prediction according to the conventional technique or the first embodiment of the present invention.
Figure 34:
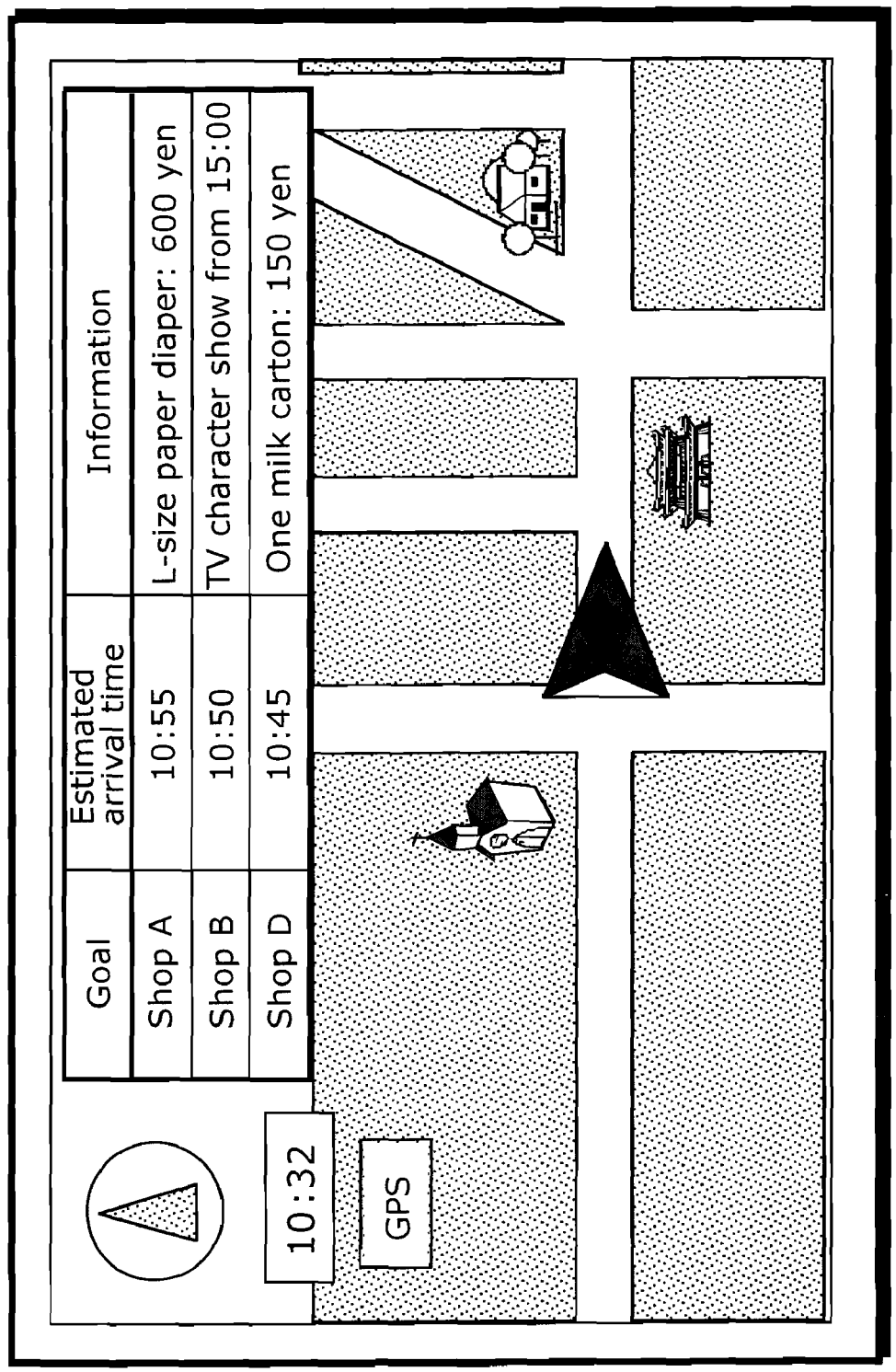
FIG. 34 shows an example of relevant information displayed on the display unit on the basis of a result of destination prediction according to the different destination-predicting method.

The destinations will be displayed in the descending order of trip frequency as illustrated in FIG. 33 (in the order of "Shop A", "Shop B", and "Shop C") when on the basis of only frequency in a past trip history or judgment of whether or not a rule is satisfied as shown in the first embodiment. The destinations will be displayed, as shown in FIG. 34, in the order of the "Shop A", "Shop B", and "Shop D" in this example where the remaining frequencies are normalized using the remaining periods and prediction probabilities are considered higher as the resulting normalized remaining frequencies are larger. The remaining frequencies after subtracting actual frequencies from the trip frequencies of the rules and the remaining periods of the unit periods are taken into consideration as well as whether or not the rules are satisfied. This will lead to finer-tuned prediction of destinations with increased accuracy.

Figure 35:
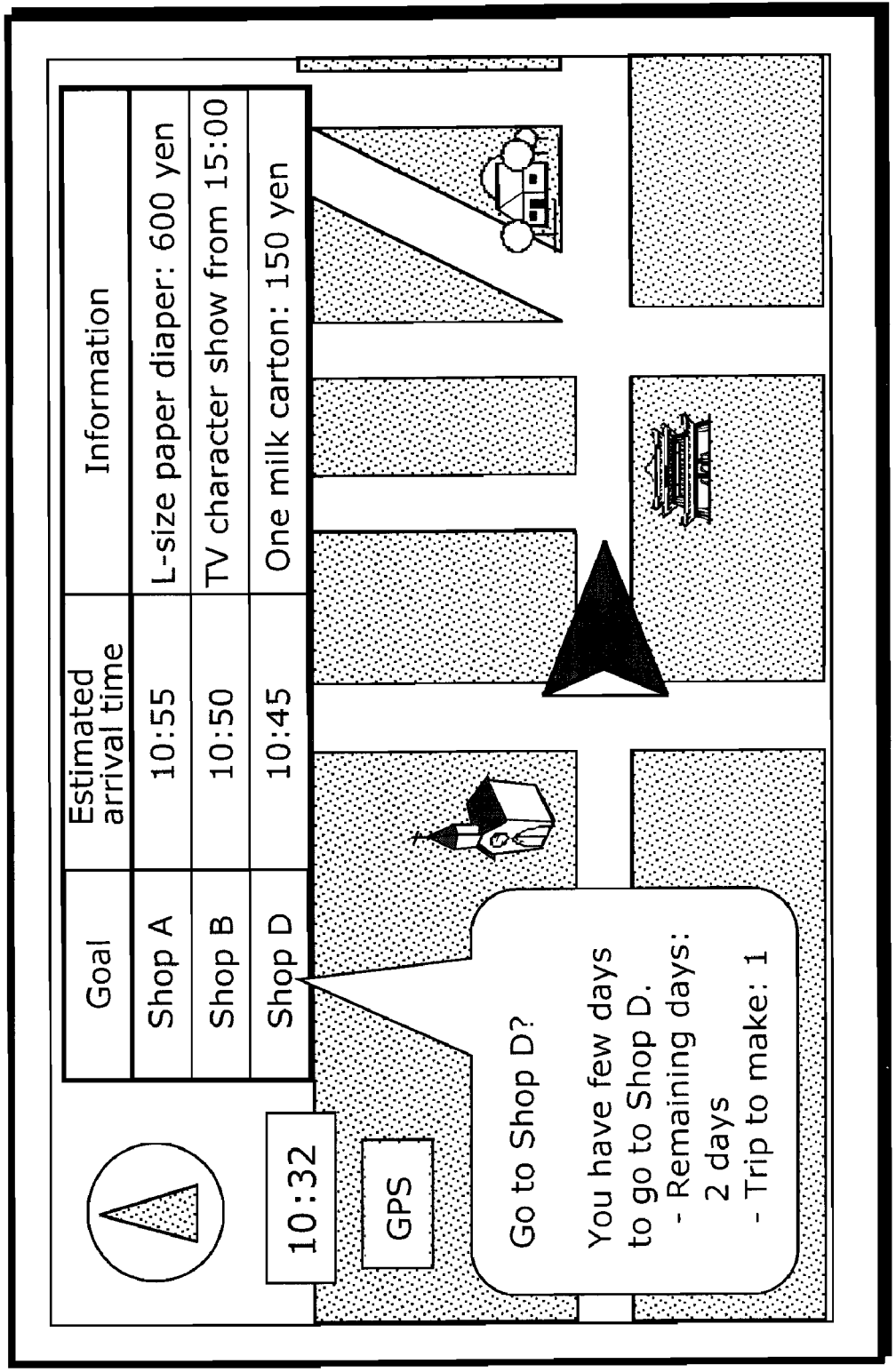
FIG. 35 shows another example of relevant information displayed on the display unit.

The actual-frequency judging unit 116 may instruct the drawing processing unit 117 to cause the display unit 106 to display a message as shown in FIG. 35 that there remains few days when the remaining days and remaining frequencies of the rules are taken into consideration and the quotients above are higher than a predetermined threshold. Similarly, landmarks with quotients above equal to or larger than a predetermined threshold (for example, 0.5) may be provided with such a message.

Figure 36:
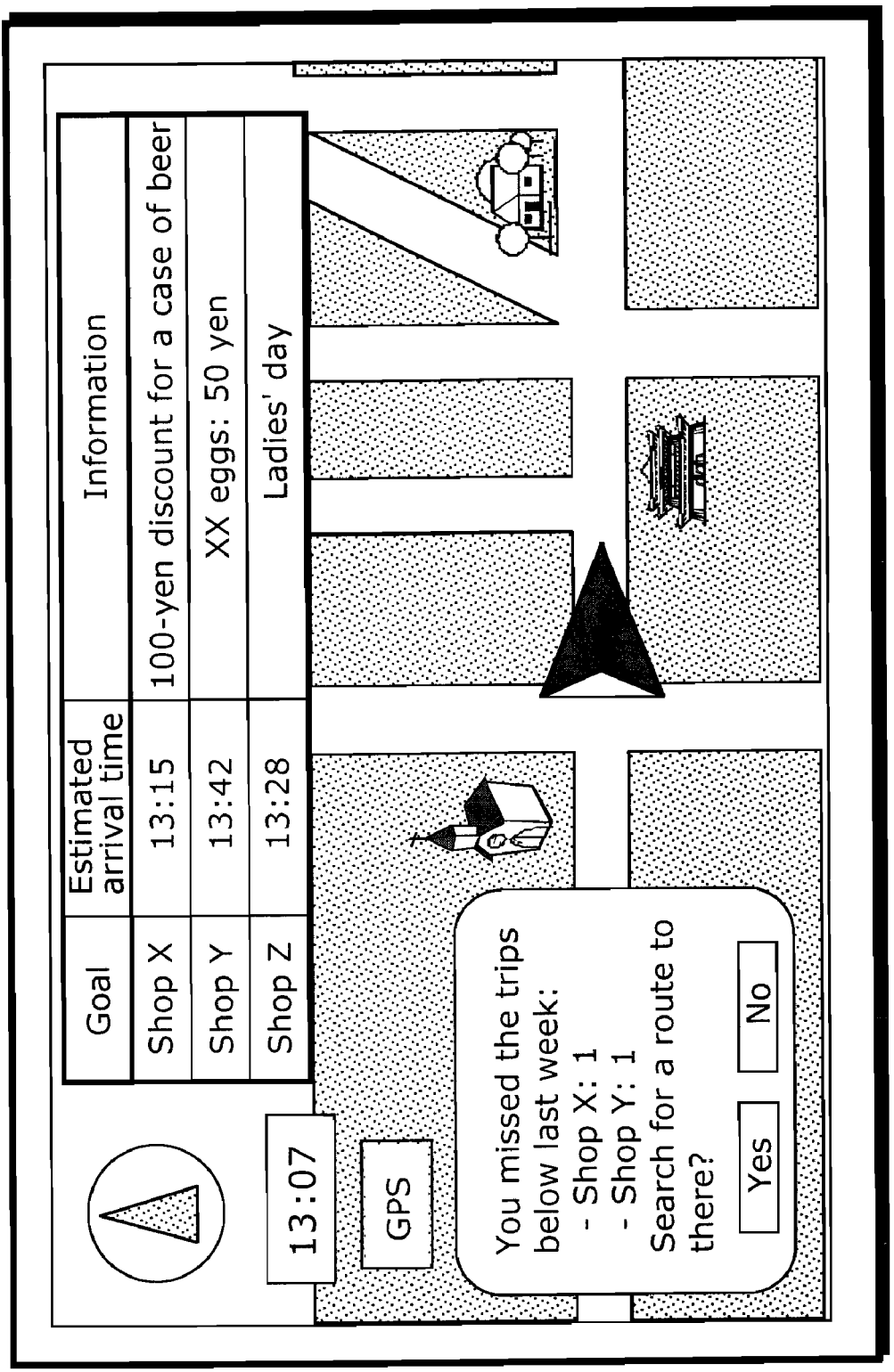
FIG. 36 shows another example of relevant information displayed on the display unit.

In the case where the actual-frequency judging unit 116 judges that a rule for a candidate destination was not satisfied in a first period unit, the message on the display unit 106 in a second period unit to follow the first period unit may tell that the rule for the candidate destination was not satisfied during the first unit period. For example, in the case where rules "twice in a week to the Shop X", "three times in a week to the Shop Y", and "once in a week to the Shop Z" are extracted, it is assumed that there has occurred a trip to the Shop X once, a trip to the Shop Y twice, and a trip to the Shop Z once during a unit period. In this case, the actual-frequency judging unit 116 may instruct the drawing processing unit 117 to cause the display unit 106 to output a message shown in FIG. 36 that tells that the rule extracted by the rule extracting unit 114 was not actually satisfied during the previous unit period or a relevant message (that asks whether or not the user wants to search for a route). The navigation apparatus may execute routing (route searching) for an efficient trip to a landmark to which a trip was not made enough times when the user instructs the navigation apparatus to search for a route upon the message. In the case where the user failed a planned visit to a place during a previous unit period, this will remind the user of it at the beginning of a subsequent unit period and allow the user to visit the place preferentially.

Figure 37:
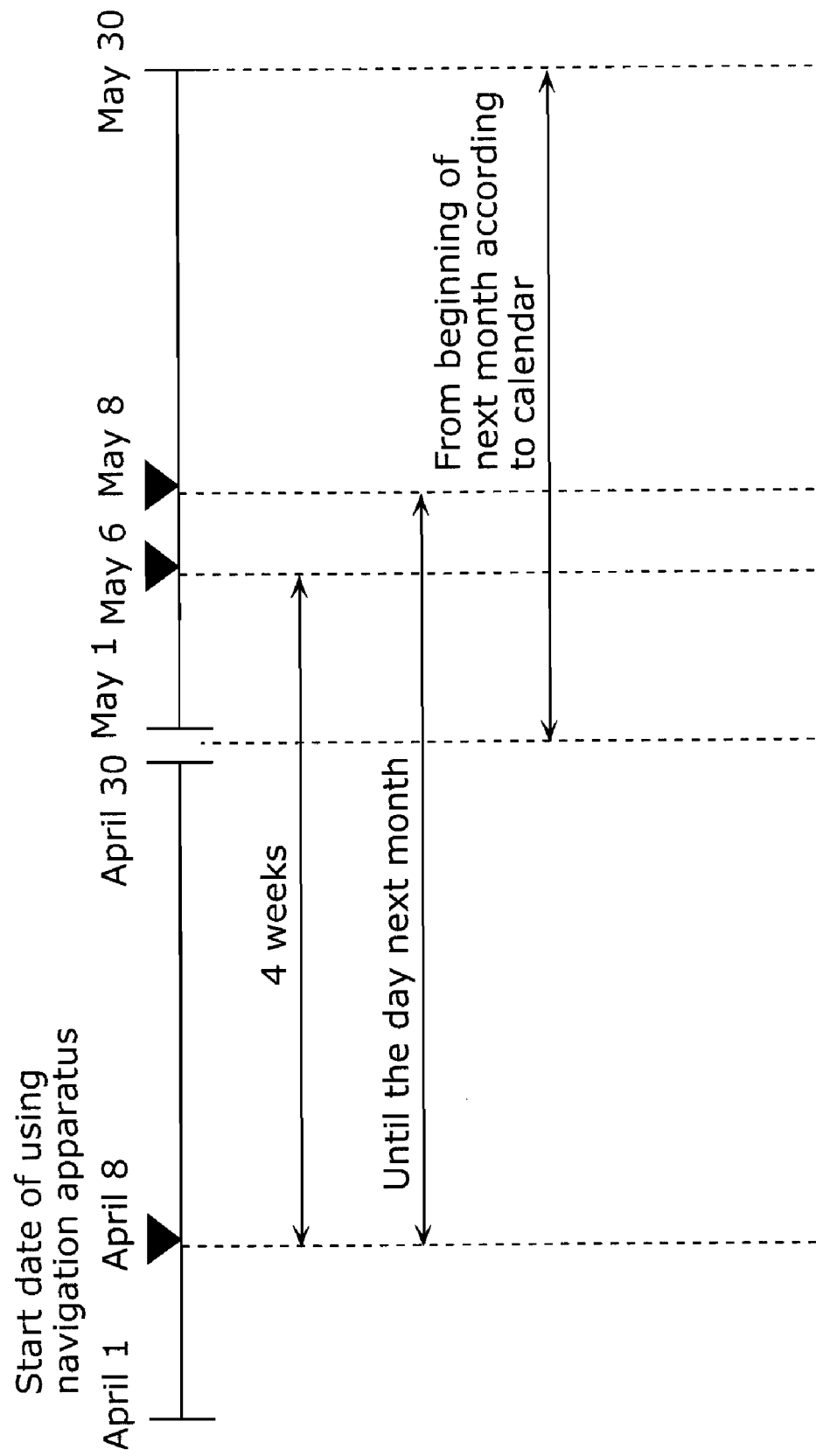
FIG. 37 shows an example of a definition of a unit period.

Further, various methods may be applied as to starting days of a unit period set by the period setting unit 113 and of a unit period used by the unit-period frequency accumulating unit 115 for specifying an actual frequency. For example, a unit period of a month may be defined as a four-week period from a day when the user starts using the navigation apparatus, as a period from a day when the user starts using the navigation apparatus until the day next month, or as a calendar month (or four weeks) starting from the beginning of a subsequent month, as shown in FIG. 37 that illustrates a definition of a unit period.

Figure 22:
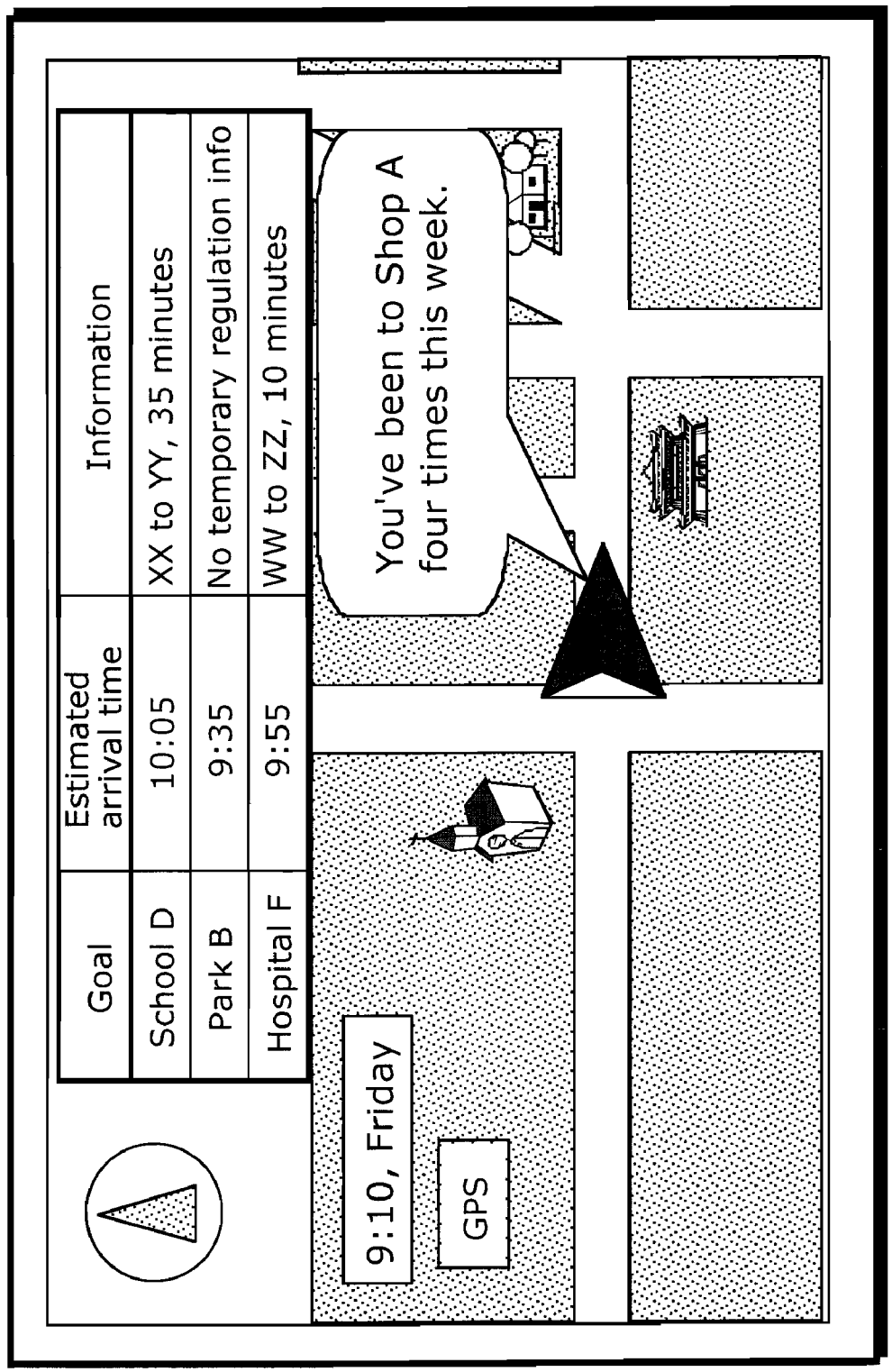
FIG. 22 shows an example of relevant information displayed on the display unit on the basis of a result of destination prediction.

Depending on such definitions of unit periods, the rule setting unit 130 and the unit-period frequency accumulating unit 115 operate differently. A rule may be extracted, for example, that a trip to the landmark A is made twice a week, and the user has actually moved to the landmark A as shown in FIGS. 38(a) and (b) (where solid triangles indicates occurrences). A period A indicates a period during which the landmark A is not displayed as a prediction result or a message as shown in FIG. 22 is displayed.

Under such conditions, the unit-period frequency accumulating unit 115 starts counting actual frequency on Mondays and ends the counting on Sundays in the case where a unit period of "a week" is set according to the calendar (FIG. 38(a)). In other words, the value counted by the unit-period frequency accumulating unit 115 is reset whenever a Monday begins. In this case, the landmark A is not excluded from prediction candidates because of the last resetting or the message as shown in FIG. 22 is not displayed during the period B from the starting day of the second week to the second occurrence as shown in the second week in FIG. 38(a).

On the other hand, the unit-period frequency accumulating unit 115 starts counting actual frequency upon an occurrence of a movement to the landmark A and ends the counting one week later in the case where a unit period of "a week" starts upon the occurrence (FIG. 38(b)). In other words, the value counted by the unit-period frequency accumulating unit 115 is reset one week later than the first detection of the occurrence. In this case, actual frequency is prior to a calendar period in predicting a destination and displaying the message even when a trip occurs on different days between weeks. This is because the length of the aforementioned period A is made constant by starting the period unit upon the occurrences as shown in FIG. 38(b).

The unit period may be therefore started according to the calendar or upon the movement of a moving object to a candidate destination in order to take advantage of each method. These methods may be implemented in the navigation apparatus alone or together in a selectable manner.

INDUSTRIAL APPLICABILITY

The present invention is applicable as a destination-prediction apparatus that predicts a destination of a moving object, especially as an information terminal such as a car navigation system installed in a vehicle or a mobile phone carried by a user. A destination predicting method according to the present invention is also applicable as a program on a server system that communicates with a car navigation system or a mobile phone via a network.

The invention claimed is:

1. A destination-prediction apparatus that predicts a destination of a moving object, said destination-prediction apparatus comprising:
    an obtaining unit configured to obtain trip history data indicating a trip history of the moving object;
    a position detecting unit configured to detect a present position of the moving object;
    a candidate-destination selecting unit configured to (i) search the trip history data obtained by the obtaining unit for trip history records containing the present position of the moving object detected by said position detecting unit, (ii) select a plurality of candidate destinations, and (iii) set an order of the selected plurality of candidate destinations on a basis of frequencies of the trip history records retrieved in the search;
    a display unit configured to display, according to the order, the plurality of candidate destinations selected by said candidate-destination selecting unit;
    a rule setting unit configured to (i) judge, for each of the plurality of candidate destinations, whether or not there is a rule for the candidate destination that the moving object moves to the candidate destination at a constant trip frequency during a certain unit period, and (ii) set the rule for the candidate destination when it is judged that there is the rule for the candidate destination, the rule including the certain unit period and the constant trip frequency;
    a unit-period frequency accumulating unit configured to specify an actual frequency for each of the plurality of candidate destinations for which a rule has been set by said rule setting unit, the actual frequency being (i) specified using the trip history data obtained by said obtaining unit during a current unit period, and (ii) a frequency at which the moving object has moved to the candidate destination during the current unit period; and
    an actual-frequency judging unit configured to judge, for each of the plurality of candidate destinations for which a rule has been set by said rule setting unit, whether or not the actual frequency specified for the candidate destination by said unit-period frequency accumulating unit satisfies the rule for the candidate destination by judging whether or not the actual frequency for the candidate destination has reached the constant trip frequency included in the rule for the candidate destination,
    wherein said display unit is configured to display the plurality of candidate destinations so as to reflect the judgment of the actual-frequency judging unit when said actual-frequency judging unit judges that the actual frequency specified for at least one of the plurality of candidate destinations satisfies the rule set for the at least one of the plurality of candidate destinations.

2. The destination-prediction apparatus according to claim 1,
    wherein said actual-frequency judging unit is configured to change the order set by said candidate-destination selecting unit, according to a result of the judgment, by placing (i) a lower priority on a candidate destination for which the rule for the candidate destination is satisfied than when the rule for the candidate destination is not satisfied, or (ii) a high priority on the candidate destination for which the rule for the candidate destination is not satisfied than when the rule for the candidate destination is satisfied, and
    wherein said display unit is configured to display the plurality of candidate destinations according to the order changed by said actual-frequency judging unit.

3. The destination-prediction apparatus according to claim 1,
    wherein said actual-frequency judging unit is configured to change the order set by said candidate-destination selecting unit by excluding, from the plurality of candidate destinations, a candidate destination for which the rule for the candidate destination is satisfied, and
    wherein said display unit is configured to display the plurality of candidate destinations according to the order changed by said actual-frequency judging unit.

4. The destination-prediction apparatus according to claim 1,
    wherein said display unit is configured to display an indication about a candidate destination which said actual-frequency judging unit judges that the rule for the candidate destination is satisfied, the indication indicating that the rule for the candidate destination is satisfied.

5. The destination-prediction apparatus according to claim 1,
    wherein said display unit is configured to display an indication about a candidate destination which said actual-frequency judging unit judges that the rule for the candidate destination was not satisfied during a first unit period, during a second unit period that follows the first unit period, the indication indicating that the rule for the candidate destination was not satisfied during the first unit period.

6. The destination-prediction apparatus according to claim 1,
wherein said actual-frequency judging unit is configured to change the order set by said candidate-destination selecting unit by reducing a prediction probability that the moving object moves to a candidate destination when, according to a result of the judgment, the rule for the candidate destination is satisfied,
wherein said display unit is configured to display the plurality of candidate destinations according to the order changed by said actual-frequency judging unit.

7. The destination-prediction apparatus according to claim 1,
wherein said rule setting unit includes:
a unit-period setting unit configured to set the certain unit period; and
a rule extracting unit configured to specify, by analyzing the trip history data for each of the plurality of candidate destinations, a frequency at which the moving object moves to the candidate destination during the certain unit period set by said unit-period setting unit, and set the specified frequency during the certain unit period as the rule for the candidate destination.

8. The destination-prediction apparatus according to claim 7,
wherein said unit-period setting unit is configured to specify, with reference to the trip history data for each of the plurality of candidate destinations, a period during which the moving object moves to the candidate destination at the constant frequency, and set the specified period as the certain unit period.

9. The destination-prediction apparatus according to claim 7,
wherein said rule setting unit further includes a maximum-frequency determining unit configured to determine, by analyzing the trip history data for each of the plurality of candidate destinations, a maximum of the frequency at which the moving object moves to the candidate destination during the certain unit period set by said period setting unit, and
wherein said rule extracting unit is configured to set the maximum of the frequency during the certain unit period as the rule for the candidate destination, the maximum being determined by said maximum-frequency determining unit.

10. The destination-prediction apparatus according to claim 9,
wherein said maximum-frequency determining unit is configured to calculate a largest value of frequencies which are in the trip history data and at which the moving object has moved to the candidate destination during the certain unit period, and determine the calculated largest value as the maximum.

11. The destination-prediction apparatus according to claim 9,
wherein said maximum-frequency determining unit is configured to specify numbers of occurrences of frequencies which are in the trip history data and at which the moving object has moved to the candidate destination during the certain unit period, and determine a frequency having a largest number of occurrences as the maximum.

12. The destination-prediction apparatus according to claim 1,
wherein the obtaining unit is further configured to obtain general-frequency-rule data that indicates a general rule for a predetermined category of destinations, the general rule being that a moving object moves to the destinations at a trip frequency during a unit period, and
wherein said rule setting unit is configured to judge whether or not there is the rule for the candidate destination and determine the certain unit period and the constant trip frequency with reference to the general-frequency-rule data.

13. The destination-prediction apparatus according to claim 1,
wherein said actual-frequency judging unit is further configured to change the order set by said candidate-destination selecting unit so that a prediction probability of movement of the moving object to a candidate destination for which the rule for the candidate destination is not satisfied decreases more as a remainder after subtracting the actual frequency from the trip frequency is smaller, the candidate destination being among the plurality of candidate destinations for which a rule has been set by said rule setting unit.

14. The destination-prediction apparatus according to claim 13,
further comprising a day-and-time detecting unit configured to detect a present day and time,
wherein said actual-frequency judging unit is configured to calculate a remaining period of the current unit period after the present day and time detected by said day-and-time detecting unit, and divide the remainder by the calculated remaining period to normalize the remainder using the remaining period, and change the order set by said candidate-destination selecting unit so that a prediction probability of movement of the moving object to the candidate destination decreases more as the normalized remainder is smaller.

15. The destination-prediction apparatus according to claim 1, further comprising:
a day-and-time detecting unit configured to detect a present day and time; and
a storage unit configured to store, as trip history data, a present position detected by said position detecting unit while associating the present position with the present day and time detected by said day-and-time detecting unit,
wherein said obtaining unit is configured to obtain the trip history data from said storage unit.

16. The destination-prediction apparatus according to claim 1,
wherein the current unit period is a period according to a calendar or a period starting when the moving object has moved to a candidate destination.

17. The destination-prediction apparatus according to claim 1,
wherein said rule setting unit judges whether or not there is the rule for the candidate destination using first trip history data from among the trip history data obtained by said obtaining unit, the first trip history data including a first trip history of the moving object during a first time period,
wherein said unit-period frequency accumulating unit specifies the actual frequency for the candidate destination using second trip history data from among the trip history data obtained by said obtaining unit, the second trip history data including a second trip history of the moving object during a second time period, wherein the first trip history data is different than the second trip history data, and wherein the first time period is longer than the second time period.

18. A navigation apparatus that supports movement of a moving object, said navigation apparatus comprising a destination prediction apparatus including:

an obtaining unit configured to obtain trip history data indicating a trip history of the moving object;

a position detecting unit configured to detect a present position of the moving object;

a candidate-destination selecting unit configured to (i) search the trip history data obtained by the obtaining unit for trip history records containing the present position of the moving object detected by said position detecting unit, (ii) select a plurality of candidate destinations, and (iii) set an order of the selected plurality of candidate destinations on a basis of frequencies of the trip history records retrieved in the search;

a display unit configured to display, according to the order, the plurality of candidate destinations selected by said candidate-destination selecting unit;

a rule setting unit configured to (i) judge, for each of the plurality of candidate destinations, whether or not there is a rule for the candidate destination that the moving object moves to the candidate destination at a constant trip frequency during a certain unit period, and (ii) set the rule for the candidate destination when it is judged that there is the rule for the candidate destination, the rule including the certain unit period and the constant trip frequency;

a unit-period frequency accumulating unit configured to specify an actual frequency for each of the plurality of candidate destinations for which a rule has been set by said rule setting unit, the actual frequency being (i) specified using the trip history data obtained by said obtaining unit during a current unit period, and (ii) a frequency at which the moving object has moved to the candidate destination during the current unit period; and an actual-frequency judging unit configured to judge, for each of the plurality of candidate destinations for which a rule has been set by said rule setting unit, whether or not the actual frequency specified for the candidate destination by said unit-period frequency accumulating unit satisfies the rule for the candidate destination by judging whether or not the actual frequency for the candidate destination has reached the constant trip frequency included in the rule for the candidate destination, wherein said display unit is configured to display the plurality of candidate destinations so as to reflect the judgment of the actual-frequency judging unit when said actual-frequency judging unit judges that the actual frequency specified for at least one of the plurality of candidate destinations satisfies the rule set for the at least one of the plurality of candidate destinations.

19. A destination-prediction method for predicting a destination of a moving object, the destination-prediction method comprising:

obtaining trip history data indicating a trip history of the moving object;

detecting a present position of the moving object;

searching the trip history data obtained in said obtaining for trip history records that contains the present position of the moving object detected by said detecting, selecting a plurality of candidate destinations, and setting an order of the selected plurality of candidate destinations on a basis of frequencies of the trip history records retrieved in the searching;

displaying, according to the order, the plurality of candidate destinations selected in said selecting;

judging, for each of the plurality of candidate destinations, whether or not there is a rule for the candidate destination that the moving object moves to the candidate destination at a constant trip frequency during a certain unit period, said judging being performed using a processor;

setting the rule for the candidate destination when it is judged that there is a rule for the candidate destination, the rule including the certain unit period and the constant trip frequency;

specifying an actual frequency for each of the plurality of candidate destinations for which a rule has been set, the actual frequency being (i) specified using the trip history data obtained by said obtaining during a current unit period, and (ii) a frequency at which the moving object has moved to the candidate destination during the current unit period;

judging, for each of the plurality of candidate destinations for which a rule has been set, whether or not the actual frequency specified for the candidate destination by said specifying satisfies the rule for the candidate destination by judging whether or not the actual frequency for the candidate destination has reached the constant trip frequency included in the rule for the candidate destination, wherein said displaying displays the plurality of candidate destinations so as to reflect the judgment by said judging for each of the plurality of candidate destinations for which a rule has been set when said judging for each of the plurality of candidate destinations for which a rule has been set judges that the actual frequency specified for at least one of the plurality of candidate destinations satisfies the rule set for the at least one of the plurality of candidate destinations.

20. A non-transitory computer readable recording medium having stored thereon a program for a destination prediction apparatus, wherein, when executed, said program causes the destination prediction apparatus to perform a method comprising:

obtaining trip history data indicating a trip history of the moving object;

detecting a present position of the moving object;

searching the trip history data obtained in said obtaining for trip history records that contains the present position of the moving object detected by said detecting, selecting a plurality of candidate destinations, and setting an order of the selected plurality of candidate destinations on a basis of frequencies of the trip history records retrieved in the searching;

displaying, according to the order, the plurality of candidate destinations selected in said selecting;

judging, for each of the plurality of candidate destinations, whether or not there is a rule for the candidate destination that the moving object moves to the candidate destination at a constant trip frequency during a certain unit period, said judging being performed using a processor;

setting the rule for the candidate destination when it is judged that there is a rule for the candidate destination, the rule including the certain unit period and the constant trip frequency;

specifying an actual frequency for each of the plurality of candidate destinations for which a rule has been set, the actual frequency being (i) specified using the trip history data obtained by said obtaining during a current unit period, and (ii) a frequency at which the moving object has moved to the candidate destination during the current unit period;

judging, for each of the plurality of candidate destinations for which a rule has been set, whether or not the actual frequency specified for the candidate destination by said specifying satisfies the rule for the candidate destination by judging whether or not the actual frequency for the candidate destination has reached the constant trip frequency included in the rule for the candidate destination, wherein said displaying displays the plurality of candidate destinations so as to reflect the judgment by said judging for each of the plurality of candidate destinations for which a rule has been set when said judging for each of the plurality of candidate destinations for which a rule has been set judges that the actual frequency specified for at least one of the plurality of candidate destinations satisfies the rule set for the at least one of the plurality of candidate destinations.

* * * * *